(12) United States Patent
Pham et al.

(10) Patent No.: US 12,136,250 B2
(45) Date of Patent: Nov. 5, 2024

(54) EXTRACTING ATTRIBUTES FROM ARBITRARY DIGITAL IMAGES UTILIZING A MULTI-ATTRIBUTE CONTRASTIVE CLASSIFICATION NEURAL NETWORK

(71) Applicant: Adobe Inc., San Jose, CA (US)

(72) Inventors: Khoi Pham, Fairfax, VA (US); Kushal Kafle, Boston, MA (US); Zhe Lin, Fremont, CA (US); Zhihong Ding, Fremont, CA (US); Scott Cohen, Sunnyvale, CA (US); Quan Tran, San Jose, CA (US)

(73) Assignee: Adobe Inc., San Jose, CA (US)

( * ) Notice: Subject to any disclaimer, the term of this patent is extended or adjusted under 35 U.S.C. 154(b) by 610 days.

(21) Appl. No.: 17/332,734

(22) Filed: May 27, 2021

(65) Prior Publication Data
US 2022/0383037 A1    Dec. 1, 2022

(51) Int. Cl.
*G06V 10/75* (2022.01)
*G06F 18/214* (2023.01)
(Continued)

(52) U.S. Cl.
CPC .......... *G06V 10/751* (2022.01); *G06F 18/214* (2023.01); *G06F 18/25* (2023.01); *G06N 3/08* (2013.01)

(58) Field of Classification Search
CPC ...... G06V 10/751; G06V 20/70; G06V 10/82; G06V 10/764; G06V 10/454; G06V 10/26; G06V 10/7747; G06V 10/7715; G06V 20/10; G06V 30/19173; G06V 10/25; G06V 10/44; G06V 10/806; G06F 18/214; G06F 18/25; G06N 3/08; G06N 3/045;
(Continued)

(56) References Cited

U.S. PATENT DOCUMENTS 10,229,346 B1 *  3/2019  Kim ..................... G06N 3/00
10,311,337 B1 *  6/2019  Kim ..................... G06V 20/00
(Continued)

OTHER PUBLICATIONS

"A Survey on Instance Segmentation: State of the art"; Hafiz, Abdul Mueed; International Journal of Multimedia Information Retrieval (2020) 9:171-189 (Year: 2020).*
(Continued)

*Primary Examiner* — Michael S Osinski
(74) *Attorney, Agent, or Firm* — Keller Preece PLLC

(57) ABSTRACT

This disclosure describes one or more implementations of systems, non-transitory computer-readable media, and methods that extract multiple attributes from an object portrayed in a digital image utilizing a multi-attribute contrastive classification neural network. For example, the disclosed systems utilize a multi-attribute contrastive classification neural network that includes an embedding neural network, a localizer neural network, a multi-attention neural network, and a classifier neural network. In some cases, the disclosed systems train the multi-attribute contrastive classification neural network utilizing a multi-attribute, supervised-contrastive loss. In some embodiments, the disclosed systems generate negative attribute training labels for labeled digital images utilizing positive attribute labels that correspond to the labeled digital images.

20 Claims, 12 Drawing Sheets

(51) Int. Cl.
   *G06F 18/25* (2023.01)
   *G06N 3/08* (2023.01)
(58) Field of Classification Search
   CPC .......... G06N 3/0895; G06N 3/09; G06N 3/04;
   G06N 3/084; G06T 2207/20084; G06T
   2207/20081; G06T 7/11; G06T 7/10;
   G06T 7/194; G06T 7/12; G06T
   2207/20016; G06T 5/50
   See application file for complete search history.

(56) References Cited

U.S. PATENT DOCUMENTS

| | | | | |
|---|---|---|---|---|
| 10,373,027 | B1* | 8/2019 | Kim | G06N 3/084 |
| 11,651,037 | B2* | 5/2023 | Shi | G06F 16/90348 707/705 |
| 11,816,188 | B2* | 11/2023 | Nabi | G06F 18/217 |
| 2018/0150684 | A1* | 5/2018 | Wang | G06V 10/454 |
| 2018/0357258 | A1* | 12/2018 | Bu | G06V 10/50 |
| 2019/0073553 | A1* | 3/2019 | Yao | G06N 3/082 |
| 2019/0164290 | A1* | 5/2019 | Wang | G06N 3/08 |
| 2019/0340462 | A1* | 11/2019 | Pao | G06V 10/82 |
| 2020/0065956 | A1* | 2/2020 | Shen | G06V 10/764 |
| 2020/0202533 | A1* | 6/2020 | Cohen | G06T 7/194 |
| 2021/0027470 | A1* | 1/2021 | Lin | G06T 11/60 |
| 2021/0089827 | A1* | 3/2021 | Kumagai | G06N 3/045 |
| 2021/0124993 | A1* | 4/2021 | Singh | G06F 18/2451 |
| 2021/0142110 | A1* | 5/2021 | Tian | G06V 20/68 |
| 2021/0150287 | A1* | 5/2021 | Baek | G06V 10/70 |
| 2021/0174149 | A1* | 6/2021 | Zhou | G06F 18/217 |
| 2021/0248408 | A1* | 8/2021 | Deng | G06T 7/13 |
| 2022/0004808 | A1* | 1/2022 | Yuan | G06T 7/136 |
| 2022/0076117 | A1* | 3/2022 | Amon | G06T 7/70 |
| 2022/0164570 | A1* | 5/2022 | Wang | G06T 7/11 |
| 2022/0262006 | A1* | 8/2022 | Park | G06N 3/04 |
| 2022/0351379 | A1* | 11/2022 | Lorsakul | G06T 7/0012 |
| 2022/0375040 | A1* | 11/2022 | Nishibori | G06T 7/194 |
| 2022/0383037 | A1* | 12/2022 | Pham | G06N 3/09 |
| 2022/0406035 | A1* | 12/2022 | Keum | G06N 3/04 |
| 2024/0176933 | A1* | 5/2024 | Xiao | G06V 10/764 |

OTHER PUBLICATIONS

Aishwarya Agrawal, Dhruv Batra, Devi Parikh, and Anirud-dha Kembhavi. Don't just assume; look and answer: Overcoming priors for visual question answering. In Proceedings of the IEEE Conference on Computer Vision and Pattern Recognition, pp. 4971-4980, 2018.

Ziad Al-Halah, Makar and Tapaswi, and Rainer Stiefelhagen. Recovering the missing link: Predicting class-attribute associations for unsupervised zero-shot learning. In Proceedings of the IEEE Conference on Computer Vision and Pattern Recognition, pp. 5975-5984, 2016.

Peter Anderson, Xiaodong He, Chris Buehler, Damien Teney, Mark Johnson, Stephen Gould, and Lei Zhang. Bottom-up and top-down attention for image captioning and visual question answering. In Proceedings of the IEEE conference on computer vision and pattern recognition, pp. 6077-6086, 2018.

Stanislaw Antol, Aishwarya Agrawal, Jiasen Lu, Margaret Mitchell, Dhruv Batra, C. Lawrence Zitnick, and Devi Parikh. VQA: Visual question answering. In The IEEE International Conference on Computer Vision (ICCV), 2015.

Philip Bachman, R Devon Hjelm, and William Buchwalter. Learning representations by maximizing mutual information across views. In Advances in Neural Information Processing Systems, pp. 15535-15545, 2019.

Tamara L Berg, Alexander C Berg, and Jonathan Shih. Automatic attribute discovery and characterization from noisy web data. In European Conference on Computer Vision, pp. 663-676. Springer, 2010.

Raffaella Bernardi, Ruket Cakici, Desmond Elliott, Aykut Erdem, Erkut Erdem, Nazli Ikizler-Cinbis, Frank Keller, Adrian Muscat, and Barbara Plank. Automatic description generation from images: A survey of models, datasets, and evaluation measures. Journal of Artificial Intelligence Research, 55:409-442, 2016.

Serhat Selcuk Bucak, RongJin, and AnilKJain. Multi-label learning with incomplete class assignments. In CVPR 2011, pp. 2801-2808. IEEE, 2011.

Mateusz Buda, Atsuto Maki, and Maciej A Mazurowski. A systematic study of the class imbalance problem in convolutional neural networks. Neural Networks, 106:249-259, 2018.

S. Chen and K. Grauman. Compare and contrast: Learning prominent visual differences. In CVPR, Jun. 2018.

Ting Chen, Simon Kornblith, Mohammad Norouzi, and Geoffrey Hinton. A simple framework for contrastive learning of visual representations. In International conference on machine learning, pp. 1597-1607. PMLR, 2020.

Tianshui Chen, Weihao Yu, Riquan Chen, and Liang Lin. Knowledge-embedded routing network for scene graph generation. In Proceedings of the IEEE/CVF Conference on Computer Vision and Pattern Recognition, pp. 6163-6171, 2019.

Zhao-Min Chen, Xiu-Shen Wei, Peng Wang, and Yanwen Guo. Multi-label image recognition with graph convolutional networks. In Proceedings of the IEEE Conference on Computer Vision and Pattern Recognition, pp. 5177-5186, 2019.

Yin Cui, Menglin Jia, Tsung-Yi Lin, Yang Song, and Serge Belongie. Class-balanced loss based on effective number of samples. In Proceedings of the IEEE Conference on Computer Vision and Pattern Recognition, pp. 9268-9277, 2019.

Thibaut Durand, Nazanin Mehrasa, and Greg Mori. Learning a deep convnet for multi-label classification with partial labels. In Proceedings of the IEEE Conference on Computer Vision and Pattern Recognition, pp. 647-657, 2019.

Ali Farhadi, Ian Endres, and Derek Hoiem. Attribute-centric recognition for cross-category generalization. In 2010 IEEE Computer Society Conference on Computer Vision and Pattern Recognition, pp. 2352-2359. IEEE, 2010.

Ali Farhadi, Ian Endres, Derek Hoiem, and David Forsyth. Describing objects by their attributes. In 2009 IEEE Conference on Computer Vision and Pattern Recognition, pp. 1778-1785. IEEE, 2009.

Vittorio Ferrari and Andrew Zisserman. Learning visual attributes. In Advances in neural information processing systems, pp. 433-440, 2008.

Sheng Guo, Weilin Huang, Xiao Zhang, Prasanna Srikhanta, Yin Cui, Yuan Li, Hartwig Adam, Matthew R Scott, and Serge Belongie. The imaterialist fashion attribute dataset. In Proceedings of the IEEE International Conference on Computer Vision Workshops, pp. 0-0, 2019.

Agrim Gupta, Piotr Dollar, and Ross Girshick. Lvis: A dataset for large vocabulary instance segmentation. In Proceedings of the IEEE Conference on Computer Vision and Pattern Recognition, pp. 5356-5364, 2019.

Chi Han, Jiayuan Mao, Chuang Gan, Joshua B. Tenenbaum, and Jiajun Wu. Visual Concept Metaconcept Learning. In Advances in Neural Information Processing Systems (NIPS), 2019.

Haibo He and Edwardo A Garcia. Learning from imbalanced data. IEEE Transactions on knowledge and data engineering, 21(9):1263-1284, 2009.

Kaiming He, Haoqi Fan, Yuxin Wu, Saining Xie, and Ross Girshick. Momentum contrast for unsupervised visual representation learning. In Proceedings of the IEEE/CVF Conference on Computer Vision and Pattern Recognition, pp. 9729-9738, 2020.

Kaiming He, Xiangyu Zhang, Shaoqing Ren, and Jian Sun. Deep residual learning for image recognition. In Proceedings of the IEEE conference on computer vision and pattern recognition, pp. 770-778, 2016.

John Hewitt and Christopher D Manning. A structural probe for finding syntax in word representations. In Proceedings of the 2019 Conference of the North American Chapter of the Association for Computational Linguistics: Human Language Technologies, vol. 1 (Long and Short Papers), pp. 4129-4138, 2019.

Chen Huang, Yining Li, Chen Change Loy, and Xiaoou Tang. Learning deep representation for imbalanced classification. In Pro-

(56) References Cited

OTHER PUBLICATIONS ceedings of the IEEE conference on computer vision and pattern recognition, pp. 5375-5384, 2016.

Drew A Hudson and Christopher D Manning. Gqa: A new dataset for real-world visual reasoning and compositional question answering. In Proceedings of the IEEE Conference on Computer Vision and Pattern Recognition, pp. 6700-6709, 2019.

Dat Huynh and Ehsan Elhamifar. A shared multi-attention framework for multi-label zero-shot learning. In Proceedings of the IEEE/CVF Conference on Computer Vision and Pattern Recognition, pp. 8776-8786, 2020.

Phillip Isola, Joseph J Lim, and Edward H Adelson. Discovering states and transformations in image collections. In Proceedings of the IEEE conference on computer vision and pattern recognition, pp. 1383-1391, 2015.

Dinesh Jayaraman and Kristen Grauman. Zero-shot recognition with unreliable attributes. In Advances in neural information processing systems, pp. 3464-3472, 2014.

Huaizu Jiang, Ishan Misra, Marcus Rohrbach, Erik Learned-Miller, and Xinlei Chen. In defense of grid features for visual question answering. In Proceedings of the IEEE/CVF Conference on Computer Vision and Pattern Recognition, pp. 10267-10276, 2020.

Justin Johnson, Ranjay Krishna, Michael Stark, Li-Jia Li, David Shamma, Michael Bernstein, and Li Fei-Fei. Image retrieval using scene graphs. In Proceedings of the IEEE conference on computer vision and pattern recognition, pp. 3668-3678, 2015.

Kushal Kafle and Christopher Kanan. Visual question answering: Datasets, algorithms, and future challenges. Computer Vision and Image Understanding, 2017.

Kushal Kafle, Robik Shrestha, and Christopher Kanan. Challenges and prospects in vision and language research. Frontiers in Artificial Intelligence, 2:28, 2019.

Sahar Kazemzadeh, Vicente Ordonez, Mark Matten, and Tamara Berg. Referitgame: Referring to objects in photographs of natural scenes. In Proceedings of the 2014 conference on empirical methods in natural language processing (EMNLP), pp. 787-798, 2014.

Prannay Khosla, Piotr Teterwak, Chen Wang, Aaron Sarna, Yonglong Tian, Phillip Isola, Aaron Maschinot, Ce Liu, and Dilip Krishnan. Supervised contrastive learning. arXiv preprint arXiv:2004.11362, 2020.

Ronak Kosti, Jose M Alvarez, Adria Recasens, and Agata Lapedriza. Emotion recognition in context. In Proceedings of the IEEE conference on computer vision and pattern recognition, pp. 1667-1675, 2017.

Ranjay Krishna, Yuke Zhu, Oliver Groth, Justin Johnson, Kenji Hata, Joshua Kravitz, Stephanie Chen, Yannis Kalantidis, Li-Jia Li, David A Shamma, et al. Visual genome: Connecting language and vision using crowdsourced dense image annotations. International journal of computer vision, 123(1):32-73, 2017.

Neeraj Kumar, Peter Belhumeur, and Shree Nayar. Face-tracer: A search engine for large collections of images with faces. In European conference on computer vision, pp. 340-353. Springer, 2008.

Kaustav Kundu and Joseph Tighe. Exploiting weakly supervised visual patterns to learn from partial annotations. Advances in Neural Information Processing Systems, 33, 2020.

Christoph H Lampert, Hannes Nickisch, and Stefan Harmeling. Learning to detect unseen object classes by between-class attribute transfer. In 2009 IEEE Conference on Computer Vision and Pattern Recognition, pp. 951-958. IEEE, 2009.

Dangwei Li, Zhang Zhang, Xiaotang Chen, Haibin Ling, and Kaiqi Huang. A richly annotated dataset for pedestrian attribute recognition. arXiv preprint arXiv:1603.07054, 2016.

Yining Li, Chen Huang, Chen Change Loy, and Xiaoou Tang. Human attribute recognition by deep hierarchical contexts. In European Conference on Computer Vision, pp. 684-700. Springer, 2016.

Yuncheng Li, Yale Song, and Jiebo Luo. Improving pair-wise ranking for multi-label image classification. In Proceedings of the IEEE conference on computer vision and pattern recognition, pp. 3617-3625, 2017.

Ziwei Liu, Ping Luo, Shi Qiu, Xiaogang Wang, and Xiaoou Tang. Deepfashion: Powering robust clothes recognition and retrieval with rich annotations. In Proceedings of the IEEE conference on computer vision and pattern recognition, pp. 1096-1104, 2016.

Jiasen Lu, Jianwei Yang, Dhruv Batra, and Devi Parikh. Hierarchical question-image co-attention for visual question answering. In Advances in neural information processing systems, pp. 289-297, 2016.

Dhruv Mahajan, Ross Girshick, Vignesh Ramanathan, Kaiming He, Manohar Paluri, Yixuan Li, Ashwin Bharambe, and Laurens van der Maaten. Exploring the limits of weakly supervised pretraining. In Proceedings of the European Conference on Computer Vision (ECCV), pp. 181-196, 2018.

George A. Miller. Wordnet: A lexical database for english. Commun. ACM, 38(11):39-41, Nov. 1995.

Tushar Nagarajan and Kristen Grauman. Attributes as operators: factorizing unseen attribute-object compositions. In Proceedings of the European Conference on Computer Vi- sion (ECCV), pp. 169-185, 2018.

Devi Parikh and Kristen Grauman. Relative attributes. In 2011 International Conference on Computer Vision, pp. 503-510. IEEE, 2011.

Genevieve Patterson and James Hays. Coco attributes: Attributes for people, animals, and objects. In European Conference on Computer Vision, pp. 85-100. Springer, 2016.

Ethan Perez, Florian Strub, Harm De Vries, Vincent Dumoulin, and Aaron Courville. Film: Visual reasoning with a general conditioning layer. In Proceedings of the AAAI Conference on Artificial Intelligence, vol. 32, 2018.

Senthil Purushwalkam, Maximilian Nickel, Abhinav Gupta, and Marc' Aurelio Ranzato. Task-driven modular networks for zero-shot compositional learning. In Proceedings of the IEEE International Conference on Computer Vision, pp. 3593-3602, 2019.

Nikolaos Sarafianos, Xiang Xu, and Ioannis A Kakadiaris. Deep imbalanced attribute classification using visual attention aggregation. In Proceedings of the European Conference on Computer Vision (ECCV), pp. 680-697, 2018.

Li Shen, Zhouchen Lin, and Qingming Huang. Relay backpropagation for effective learning of deep convolutional neural networks. In European conference on computer vision, pp. 467-482. Springer, 2016.

Minchul Shin. Semi-supervised learning with a teacher-student network for generalized attribute prediction. arXiv preprint arXiv:2007.06769, 2020.

Behjat Siddiquie, Rogerio S Feris, and Larry S Davis. Image ranking and retrieval based on multi- attribute queries. In CVPR 2011, pp. 801-808. IEEE, 2011.

Yaser Souri, Erfan Noury, and Ehsan Adeli. Deep relative attributes. In Asian conference on computer vision, pp. 118-133. Springer, 2016.

Robert Speer, Joshua Chin, and Catherine Havasi. Conceptnet 5.5: An open multilingual graph of general knowledge. arXiv preprint arXiv:1612.03975, 2016.

Chen Sun, Abhinav Shrivastava, Saurabh Singh, and Abhinav Gupta. Revisiting unreasonable effectiveness of data in deep learning era. In Proceedings of the IEEE international conference on computer vision, pp. 843-852, 2017.

Yu-Yin Sun, Yin Zhang, and Zhi-Hua Zhou. Multi-label learning with weak label. In Proceedings of the twenty-fourth AAAI conference on artificial intelligence, pp. 593-598, 2010.

Chiat-Pin Tay, Sharmili Roy, and Kim-Hui Yap. Aanet: Attribute attention network for person re-identifications. In Proceedings of the IEEE Conference on Computer Vision and Pattern Recognition, pp. 7134-7143, 2019.

Damien Teney, Kushal Kafle, Robik Shrestha, Ehsan Abbasnejad, Christopher Kanan, and Anton van den Hengel. On the value of out-of-distribution testing: An example of goodhart's law. In Conference on Neural Information Processing Systems (NeurIPS), 2020.

Andreas Veit, Neil Alldrin, Gal Chechik, Ivan Krasin, Abhinav Gupta, and Serge Belongie. Learning from noisy large-scale datasets with minimal supervision. In Proceedings of the IEEE conference on computer vision and pattern recognition, pp. 839-847, 2017.

(56) References Cited

OTHER PUBLICATIONS

Nam Vo, Lu Jiang, Chen Sun, Kevin Murphy, Li-Jia Li, Li Fei-Fei, and James Hays. Composing text and image for image retrieval-an empirical odyssey. In Proceedings of the IEEE/CVF Conference on Computer Vision and Pattern Recognition, pp. 6439-6448, 2019.

Xin Wang, Fisher Yu, Ruth Wang, Trevor Darrell, and Joseph E Gonzalez. Tafe-net: Task-aware feature embeddings for low shot learning. In Proceedings of the IEEE/CVF Conference on Computer Vision and Pattern Recognition, pp. 1831-1840, 2019.

Yu-Xiong Wang, Deva Ramanan, and Martial Hebert. Learning to model the tail. In Advances in Neural Information Processing Systems, pp. 7029-7039, 2017.

Zhouxia Wang, Tianshui Chen, Guanbin Li, Ruijia Xu, and Liang Lin. Multi-label image recognition by recurrently discovering attentional regions. In Proceedings of the IEEE international conference on computer vision, pp. 464-472, 2017.

Baoyuan Wu, Fan Jia, Wei Liu, Bernard Ghanem, and Siwei Lyu. Multi-label learning with missing labels using mixed dependency graphs. International Journal of Computer Vision, 126(8):875-896, 2018.

Chenyun Wu, Zhe Lin, Scott Cohen, Trung Bui, and Subhransu Maji. Phrasecut: Language-based image segmentation in the wild. In Proceedings of the IEEE/CVF Conference on Computer Vision and Pattern Recognition, pp. 10216-10225, 2020.

Zhirong Wu, Yuanjun Xiong, Stella X Yu, and Dahua Lin. Unsupervised feature learning via non-parametric instance discrimination. In Proceedings of the IEEE Conference on Computer Vision and Pattern Recognition, pp. 3733-3742, 2018.

Yongqin Xian, Christoph H Lampert, Bernt Schiele, and Zeynep Akata. Zero-shot learning-a comprehensive evaluation of the good, the bad and the ugly. IEEE transactions on pattern analysis and machine intelligence, 41(9):2251-2265, 2018.

Kelvin Xu, Jimmy Ba, Ryan Kiros, Kyunghyun Cho, Aaron Courville, Ruslan Salakhudinov, Rich Zemel, and Yoshua Bengio. Show, attend and tell: Neural image caption generation with visual attention. In International conference on machine learning, pp. 2048-2057, 2015.

Hao Yang, Joey Tianyi Zhou, and Jianfei Cai. Improving multi-label learning with missing labels by structured semantic correlations. In European conference on computer vision, pp. 835-851. Springer, 2016.

Yuzhe Yang and Zhi Xu. Rethinking the value of labels for improving class-imbalanced learning. In Conference on Neural Information Processing Systems (NeurIPS), 2020.

Hsiang-Fu Yu, Prateek Jain, Purushottam Kar, and Inderjit Dhillon. Large-scale multi-label learning with missing labels. In International conference on machine learning, pp. 593-601, 2014.

Alireza Zareian, Svebor Karaman, and Shih-Fu Chang. Bridging knowledge graphs to generate scene graphs. In European Conference on Computer Vision, pp. 606-623. Springer, 2020.

Pengchuan Zhang, Xiujun Li, Xiaowei Hu, Jianwei Yang, Lei Zhang, Lijuan Wang, Yejin Choi, and Jianfeng Gao. Vinvl: Making visual representations matter in vision-language models. arXiv preprint arXiv:2101.00529, 2021.

Sanyi Zhang, Zhanjie Song, Xiaochun Cao, Hua Zhang, and Jie Zhou. Task-aware attention model for clothing attribute prediction. IEEE Transactions on Circuits and Systems for Video Technology, 30(4): 1051-1064, 2019.

Xiangyun Zhao, Yi Yang, Feng Zhou, Xiao Tan, Yuchen Yuan, Yingze Bao, and Ying Wu. Recognizing part attributes with insufficient data. In Proceedings of the IEEE/CVF International Conference on Computer Vision, pp. 350-360, 2019.

Bolei Zhou, Agata Lapedriza, Aditya Khosla, Aude Oliva, and Antonio Torralba. Places: A 10 million image database for scene recognition. IEEE Transactions on Pattern Analysis and Machine Intelligence, 2017.

Yonglong Tian, Dilip Krishnan, and Phillip Isola. Contrastive multiview coding. arXiv preprint arXiv:1906.05849, 2019.

Qizhe Xie, Zihang Dai, Eduard Hovy, Minh-Thang Luong, and Quoc V Le. Unsupervised data augmentation for consistency training. arXiv preprint arXiv:1904.12848, 2019.

Jia Deng, Wei Dong, Richard Socher, Li-Jia Li, Kai Li, and Li Fei-Fei. Imagenet: A large-scale hierarchical image database. In 2009 IEEE conference on computer vision and pattern recognition, pp. 248-255. Ieee, 2009.

Yunchao Gong, Yangqing Jia, Thomas Leung, Alexander Toshev, and Sergey Ioffe. Deep convolutional ranking for multilabel image annotation. arXiv preprint arXiv:1312.4894, 2013.

Adam Paszke, Sam Gross, Soumith Chintala, Gregory Chanan, Edward Yang, Zachary DeVito, Zeming Lin, Al- ban Desmaison, Luca Antiga, and Adam Lerer. Automatic differentiation in pytorch. 2017.

Jeffrey Pennington, Richard Socher, and Christopher D Manning. Glove: Global vectors for word representation. In Proceedings of the 2014 conference on empirical methods in natural language processing (EMNLP), pp. 1532-1543, 2014.

Chufeng Tang, Lu Sheng, Zhaoxiang Zhang, and Xiaolin Hu. Improving pedestrian attribute recognition with weakly-supervised multi-scale attribute-specific localization. In Proceedings of the IEEE International Conference on Computer Vision, pp. 4997-5006, 2019.

* cited by examiner

EXTRACTING ATTRIBUTES FROM ARBITRARY DIGITAL IMAGES UTILIZING A MULTI-ATTRIBUTE CONTRASTIVE CLASSIFICATION NEURAL NETWORK

BACKGROUND

Recent years have seen an increase in the utilization of machine learning models to predict visual attributes for objects portrayed in digital images. Indeed, many conventional systems utilize predicted visual attributes in a variety of computer vision tasks such as image search and retrieval, tagging, referring expressions, visual question answering (VQA), and image captioning. While conventional systems exist for visual attribute prediction in digital images, these conventional systems typically have a number of shortcomings with regard to accuracy and flexibility in predicting visual attributes at a large scale for arbitrary digital images (i.e., images outside of a domain of trained images).

SUMMARY

This disclosure describes one or more implementations of systems, non-transitory computer-readable media, and methods that extract multiple attributes (e.g., positive and negative attribute labels) from one or more objects portrayed in a digital image utilizing a multi-attribute contrastive classification neural network. In particular, in some embodiments, the disclosed systems generate high-level and low-level attribute feature maps from a digital image to determine the positive and negative attribute labels of the object portrayed in the digital image. In one or more embodiments, the disclosed systems also utilize a multi-attribute contrastive classification neural network that localizes attribute predictions to a portion of a digital image that portrays the object utilizing a localizer neural network. Additionally, in some instances, the disclosed systems utilize multi-attention layers, as part of the multi-attribute contrastive classification neural network, to focus on different parts of a portrayed object while predicting attributes for the portrayed object. In order to accurately predict attributes from an object portrayed within a digital image, the disclosed systems, in one or more embodiments, train the multi-attribute contrastive classification neural network utilizing a multi-attribute, supervised-contrastive loss from an attribute-aware embedding space. Additionally, in some embodiments, the disclosed systems also train the multi-attribute contrastive classification neural network utilizing a dataset of labeled images that include positive attribute labels and one or more negative attribute labels that are generated through a negative label expansion algorithm.

BRIEF DESCRIPTION OF THE DRAWINGS

The detailed description is described with reference to the accompanying drawings in which.

DETAILED DESCRIPTION

Figure 1:
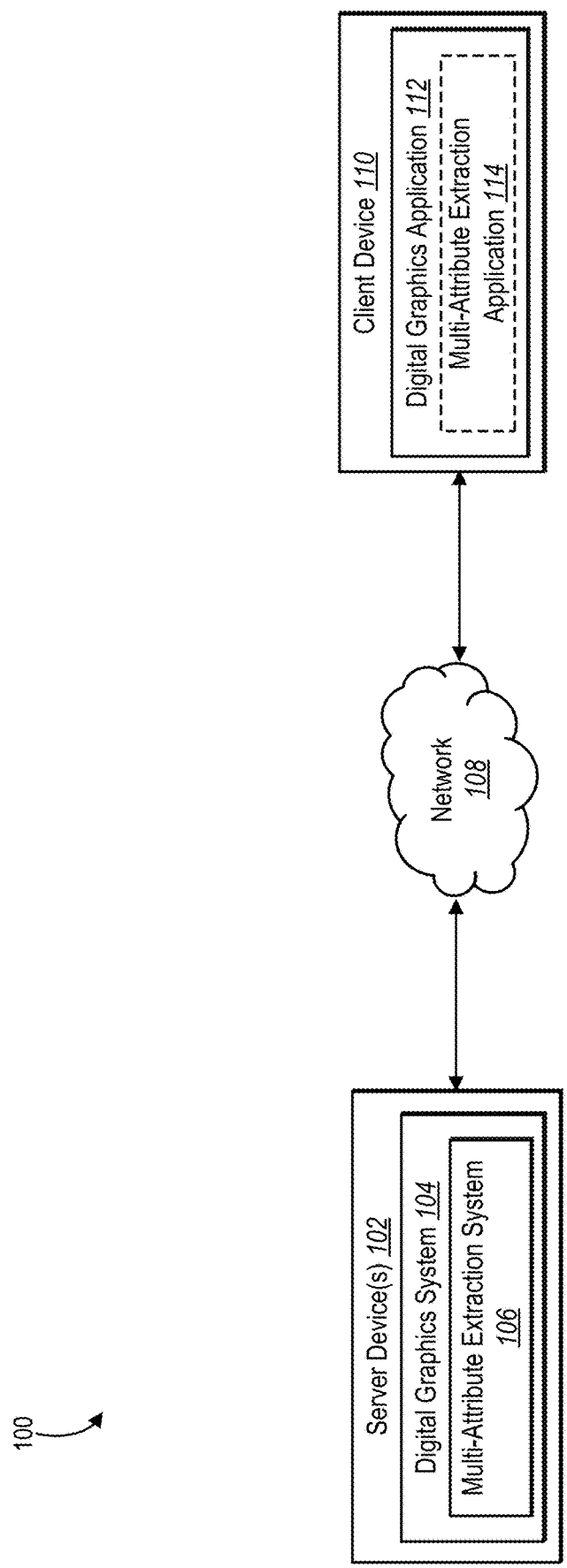
FIG. 1 illustrates a schematic diagram of an example system in which the multi-attribute extraction system operates in accordance with one or more implementations.

This disclosure describes one or more implementations of a multi-attribute extraction system that extracts multiple attributes (positive and negative labels) from objects portrayed in digital images utilizing a multi-attribute contrastive classification neural network. For example, the multi-attribute extraction system utilizes a multi-attribute contrastive classification neural network that includes an embedding neural network (that generates both high-level and low-level features), a localizer neural network (that focuses feature vectors to the object portrayed in the digital image), a multi-attention neural network (that analyzes various object subparts to determine salient features), and a classifier neural network (that can process localized high-level features, localized low-level features, and multi-attention features to generate multiple attribute labels). In some cases, the multi-attribute extraction system trains the multi-attribute contrastive classification neural network utilizing a multi-attribute, supervised-contrastive loss. In addition, in some embodiments, the multi-attribute extraction system generates negative attribute training labels for labeled digital images utilizing positive attribute labels that correspond to the labeled digital images. Indeed, in one or more embodiments, the multi-attribute extraction system utilizes the labeled digital images to train the multi-attribute contrastive classification neural network.

As just mentioned, the multi-attribute extraction system can utilize a unique neural network architecture to generate various features that are processed by a neural network classifier to generate predictions for multiple positive and negative attributes. Specifically, the multi-attribute extraction system can generate a localized-image object feature vector, a localized low-level attribute feature vector, and a multi-attention feature vector. The multi-attribute extraction system can utilize a classifier neural network to process these feature vectors to generate an accurate prediction of various attributes of an object portrayed in the digital image. Indeed, in this manner, the multi-attribute extraction system can consider both high-level and low-level features, while focusing the analysis to localized features of the object portrayed in the digital image and various subparts of the digital image that are pertinent to accurately generating classification labels.

As mentioned above, in some embodiments, the multi-attribute extraction system generates a localized-image object feature vector for a digital image portraying an object. Specifically, the multi-attribute extraction system generates a high-level attribute feature map utilizing the embedding neural network and the digital image. Then, in some embodiments, the multi-attribute extraction system generates an image-object feature map by combining the high-level attribute feature map and an object-label embedding vector from an input label corresponding to the object portrayed in the digital image. In addition, in some embodiments, the multi-attribute extraction system utilizes a localizer neural network to generate a localized object attention feature vector that reflects a segmentation prediction of the object portrayed in the digital image (e.g., a relevant-object prediction). In one or more embodiments, the multi-attribute extraction system generates the localized-image object feature vector by combining the image-object feature map and the localized-object attention feature vector.

As discussed, in one or more embodiments, the multi-attribute extraction system also generates a localized low-level attribute feature vector. In particular, in one or more embodiments, the multi-attribute extraction system generates a low-level attribute feature map utilizing the embedding neural network and the digital image. Then, in some embodiments, the multi-attribute extraction system generates the localized low-level attribute feature vector by combining the low-level attribute feature map with the localized object attention feature vector from the localizer neural network.

In some instances, the multi-attribute extraction system also generates a multi-attention feature vector that focuses on different portions of a portrayed object while predicting attributes for the object. For example, the multi-attribute extraction system generates the multi-attention feature vector by using attention layers of a multi-attention neural network with the image-object feature map (generated from the high-level attribute feature map). Subsequently, the multi-attribute extraction system determines positive and/or negative attribute labels for the object portrayed within the digital image by utilizing a classifier neural network with various combinations of the localized-image object feature vector, the localized low-level attribute feature vector, and the multi-attention feature vector.

In one or more embodiments, the multi-attribute extraction system utilizes a multi-attribute, contrastive classification neural network that is trained to accurately determine both positive and negative attribute labels (e.g., via output attribute probabilities) for objects portrayed within a digital image. For example, the multi-attribute extraction system generates a dataset of labeled ground truth images. In certain instances, the multi-attribute extraction system generates negative attribute labels for the labeled ground truth images by utilizing a language repository with the positive attribute labels corresponding to the ground truth images to expand the negative attribute labels. Furthermore, in some embodiments, the multi-attribute extraction system also determines a reweighted binary cross-entropy loss utilizing the labeled ground truth images to learn parameters of the multi-attribute, contrastive classification neural network.

In addition, in certain instances, the multi-attribute extraction system also utilizes a multi-attribute, supervised-contrastive loss. For example, the multi-attribute extraction system utilizes an image embedding vector to map an image-object feature map (generated from an object portrayed in a digital image) and image-object feature maps (generated from similar objects portrayed in one or more ground truth images that have overlapping attributes) to an attribute-aware embedding space. For example, the attribute-aware embedding space includes dimensions (or axes) that correspond to various attributes. Then, in one or more embodiments, the multi-attribute extraction system determines the multi-attribute, supervised-contrastive loss by comparing the object and the similar objects along the dimensions for the attributes within the attribute-aware embedding space. Indeed, in one or more embodiments, the multi-attribute extraction system learns parameters of the multi-attribute, contrastive classification neural network utilizing the determined multi-attribute, supervised-contrastive loss.

As mentioned above, conventional systems suffer from a number of shortcomings, particularly with regard to the accuracy and flexibility of implementing computing devices. For example, many conventional attribute extraction systems fail to accurately extract attributes for a wide variety of object and attribute combinations from digital images. Indeed, oftentimes, conventional attribute extraction systems incorrectly label attributes for objects portrayed in digital images. Furthermore, in many cases, conventional attribute extraction systems also generate classifications that have high label noise such that the classifications include a high number of labels that do not accurately describe the object portrayed in a digital image. This, in many cases, leads to ambiguous labeling of attributes by conventional attribute extraction systems.

Furthermore, conventional attribute extraction systems are often rigid. In particular, many conventional attribute extraction systems are able to only extract attributes in a domain-specific attribute prediction setting (e.g., on trained images and attributes). Also, many conventional attribute extraction systems focus on datasets that consist of limited object and attribute pairs leading to a low coverage in types of attribute-object pairings that can be achieved (i.e., a sparse number of accurate attribute labels). Moreover, many conventional attribute extraction systems are also limited to partial label annotations (and often lack negative attribute labels) during training and, therefore, are unable to train or evaluate models for large number of attribute predictions.

These technical shortcomings often lead to conventional attribute extraction systems that are unable to accurately predict a wide variety of attributes for objects portrayed in digital images outside of objects and digital images that are similar to a domain of training images. As such, many conventional attribute extraction systems are unable to accurately identify attributes of a wide variety of objects portrayed in arbitrary digital images.

The multi-attribute extraction system provides a number of advantages over conventional attribute extraction systems. Unlike conventional systems, the multi-attribute extraction system accurately extracts both positive and negative attribute labels for a greater number of unique attributes and a greater number of unique objects by utilizing a high annotation density labeled digital image dataset generated utilizing expanded negative attribute labels from external language repositories and label hierarchies. Furthermore, in contrast to conventional attribute extraction systems, the multi-attribute extraction system accurately extracts attributes for a wider variety of object and attribute combinations from arbitrary digital images (e.g., digital images that are outside the domain of trained images) by utilizing a model that considers both low- and high-level features to address the heterogeneity in features for different classes of attributes (e.g., color vs. action). For example, the multi-attribute extraction system accurately extracts attributes for arbitrary digital images that are captured in unconstrained settings where object occlusion, complication background, and/or diverse lighting conditions are present.

Additionally, in some embodiments, the multi-attribute extraction system also improves the accuracy of extracting positive and negative attribute labels from digital images by utilizing multi-hop attention models and by separating a relevant object from other information utilizing segmentation masks (e.g., in a localizer neural network). Moreover, in one or more embodiments, the multi-attribute extraction system utilizes a multi-attribute, supervised contrastive learning approach with an attribute-aware embedding space to learn more attribute discriminative features compared to many conventional attribute extraction systems. Indeed, as described in greater detail below (via experimental results), the multi-attribute extraction system predicts attribute labels for digital images with an accuracy improvement of approximately 5 mean average precision (map) points in many cases.

Also, as previously mentioned, many conventional attribute extraction systems are rigid and only capable of extracting attributes in a domain-specific prediction setting. In contrast, the multi-attribute extraction system improves flexibility by utilizing a multi-attribute contrastive classification neural network that accurately predicts a wide number of attributes for a wide number of objects. Indeed, in addition to a wider number of attributes and objects, by utilizing the multi-attribute contrastive classification neural network to increase the accuracy of multi-attribute classifications of arbitrary digital images, the multi-attribute extraction system easily predicts such attributes in arbitrary images (e.g., images that are obtained from outside of a domain of trained images). The ability to accurately extract attributes in arbitrary digital images enables the multi-attribute extraction system to flexibly be utilized in applications such as, but not limited to, image search and retrieval, tagging, referring expressions, VQA, self-driving vehicle artificial intelligence, and/or image captioning.

Turning now to the figures, FIG. 1 illustrates a schematic diagram of one implementation of a system 100 (or environment) in which a multi-attribute extraction system operates in accordance with one or more implementations. As illustrated in FIG. 1, the system 100 includes server device(s) 102, a network 108, and a client device 110. As further illustrated in FIG. 1, the server device(s) 102 and the client device 110 communicate via the network 108.

As shown in FIG. 1, the server device(s) 102 include a digital graphics system 104 which further includes the multi-attribute extraction system 106. For example, the server device(s) includes, but is not limited to, a computing (or computer) device (as explained below with reference to FIG. 12). In some implementations, the multi-attribute extraction system 106 utilizes a multi-attribute contrastive classification neural network to determine positive and negative attribute labels for an object portrayed within a digital image. Furthermore, in certain instances, the multi-attribute extraction system 106 learns parameters for various components of the multi-attribute contrastive classification neural network utilizing a labeled image dataset with expanded negative attribute labels, a multi-attribute, supervised-contrastive loss, and/or a reweighted binary cross-entropy loss.

Furthermore, as shown in FIG. 1, the system 100 includes the client device 110. In one or more implementations, the client device 110 includes, but is not limited to, a mobile device (e.g., smartphone, tablet), a laptop, a desktop, or another type of computing device, as explained below with reference to FIG. 12. In certain implementations, although not shown in FIG. 1, the client device 110 is operated by a user to perform a variety of functions (e.g., via the digital graphics application 112). For example, the client device 110 performs functions such as, but not limited to, receiving and/or transmitting digital images, determining positive and/or negative attribute labels for digital images, implementing the multi-attribute contrastive classification neural network, and/or utilizing positive and/or negative attribute labels of digital images within digital image applications.

To access the functionalities of the multi-attribute extraction system 106 (as described above), in one or more implementations, a user interacts with the digital graphics application 112 on the client device 110. For instance, the digital graphics application 112 includes one or more software applications installed on the client device 110 (e.g., to determine positive and/or negative attribute labels for digital images in accordance with one or more implementations herein). In some instances, the digital graphics application 112 is hosted on the server device(s) 102. In addition, when hosted on the server device(s), the digital graphics application 112 is accessed by the client device 110 through a web browser and/or another online interfacing platform and/or tool.

Although FIG. 1 illustrates the multi-attribute extraction system 106 being implemented by a particular component and/or device within the system 100 (e.g., the server device(s) 102), in some implementations, the multi-attribute extraction system 106 is implemented, in whole or part, by other computing devices and/or components in the system 100. For instance, in some implementations, the multi-attribute extraction system 106 is implemented on the client device 110 within the digital graphics application 112. In particular, in one or more implementations, the description of (and acts performed by) the multi-attribute extraction system 106 are implemented (or performed by) the multi-attribute extraction application 114 when the client device 110 implements the multi-attribute extraction system 106. More specifically, in certain instances, the client device 110 (via an implementation of the multi-attribute extraction system 106 on the multi-attribute extraction application 114) determines positive and/or negative attribute labels for digital images in accordance with one or more implementations.

Additionally, as shown in FIG. 1, the system 100 includes the network 108. As mentioned above, in some instances, the network 108 enables communication between components of the system 100. In certain implementations, the network 108 includes a suitable network and may communicate using any communication platforms and technologies suitable for transporting data and/or communication signals, examples of which are described with reference to FIG. 12. Furthermore, although FIG. 1 illustrates the server device(s) 102 and the client device 110 communicating via the network 108, in certain implementations, the various components of the system 100 communicate and/or interact via other methods (e.g., the server device(s) 102 and the client device 110 communicating directly).

Figure 2:
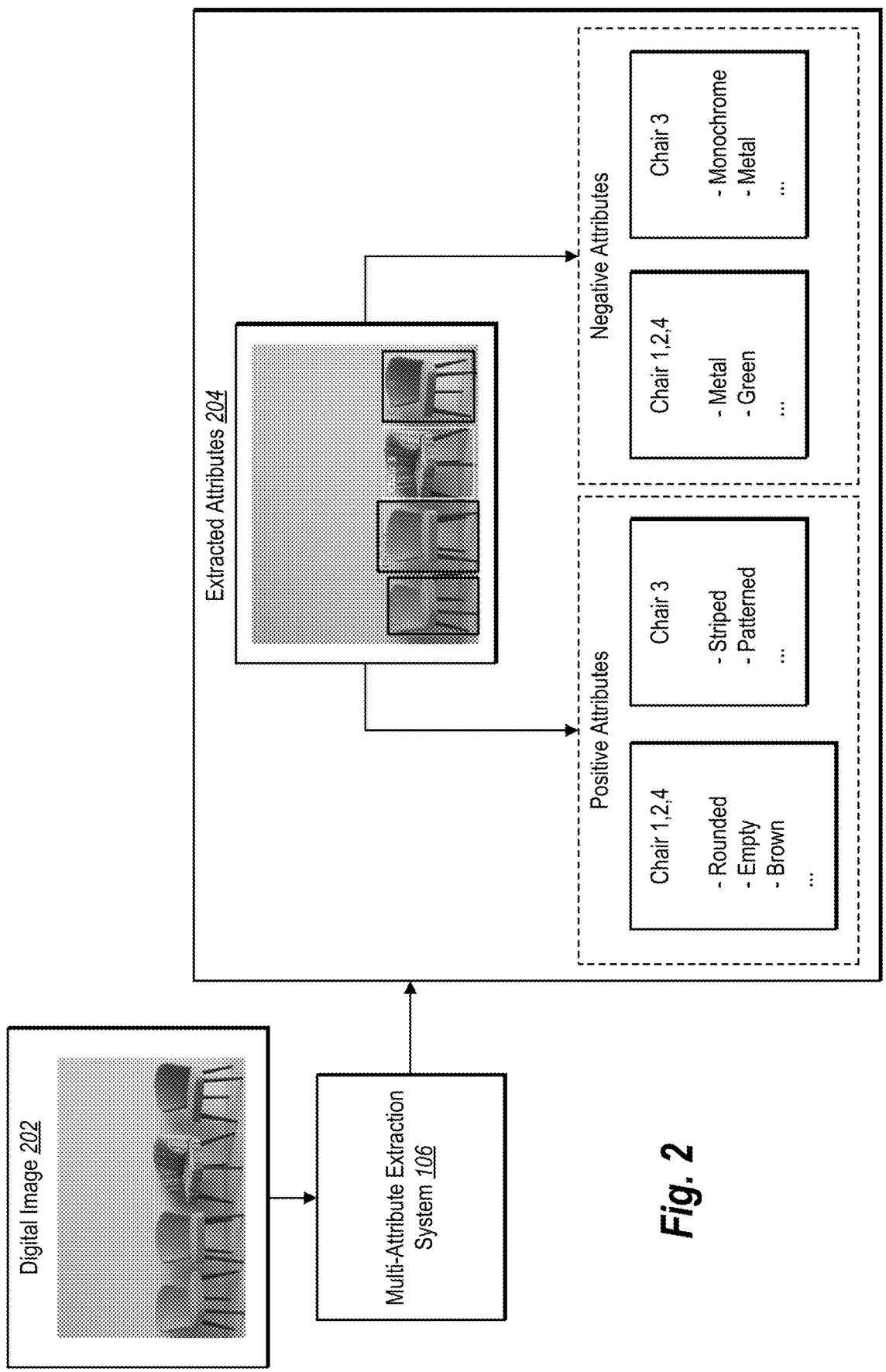
FIG. 2 illustrates an overview of the multi-attribute extraction system extracting attributes from a digital image in accordance with one or more implementations.

As previously mentioned, the multi-attribute extraction system 106 extracts multiple attribute labels (positive and negative) for objects portrayed in a digital image. For example, FIG. 2 illustrates an overview of the multi-attribute extraction system 106 determining attribute labels for an object portrayed in a digital image. As shown in FIG. 2, the multi-attribute extraction system 106 identifies a digital image 202. Then, the multi-attribute extraction system 106 generates extracted attributes 204 for the digital image 202.

As illustrated in FIG. 2, the multi-attribute extraction system 106 identifies attributes for different objects from the digital image 202 (e.g., chairs 1, 2 and 4 and chair 3). In addition, as shown in FIG. 2, the multi-attribute extraction system 106 accurately identifies both positive and negative attributes for objects portrayed in the digital image 202. For example, the multi-attribute extraction system 106 extracts positive attribute labels such as "rounded," "empty," and "brown" from chairs 1, 2, and 4 (as objects) portrayed in the digital image 202. In addition, as shown in FIG. 2, the multi-attribute extraction system 106 extracts positive attribute labels such as striped and patterned for chair 3 portrayed in the digital image 202. Likewise, as illustrated in FIG. 2, the multi-attribute extraction system 106 also extracts negative attribute labels such as metal and green for the chairs 1, 2, and 4 (i.e., chairs 1, 2, and 4 are not metal and not green) and monochrome and metal for the chair 3 (i.e., chair 3 is not monochrome and not metal).

In some embodiments, the multi-attribute extraction system 106 identifies bounding boxes for multiple objects portrayed in a digital image. Then, the multi-attribute extraction system 106 determines attributes for the multiple objects by utilizing each object with the multi-attribute contrastive classification neural network to determine predicted attributes in accordance with one or more embodiments herein. In certain instances, the multi-attribute extraction system 106 utilizes an object detector model (e.g., an object classifier) to determine a bounding box for each object portrayed in a digital image, then crops each object from the digital image, and provides each object to the multi-attribute contrastive classification neural network to determine attributes for each object.

In one or more embodiments, a digital image includes a digital symbol, picture, icon, and/or other visual illustration depicting one or more objects. For example, an image includes a digital file having a visual illustration and/or depiction of an object. Indeed, in some embodiments, an image includes, but is not limited to, a digital file with the following extensions: JPEG, TIFF, BMP, PNG, RAW, or PDF. Furthermore, in one or more embodiments, an object includes a person or article that is a subject (e.g., portrayed in or part of) a digital image. In some cases, an object includes, but is not limited to, a person, an animal, furniture, cars, plants, food, a building, and/or a sign. Although one or more embodiments illustrate the multi-attribute extraction system extracting attributes from objects portrayed in a digital image, the multi-attribute extraction system, in some embodiments, extracts attributes of one or more objects portrayed within frames of a digital video.

In some embodiments, an attribute includes a visual property of an object. For example, an attribute type (or attribute class) includes, but is not limited to, color, material, shape, texture, descriptor, label, or state. Moreover, in some embodiments, an attribute within an attribute type of color includes, but is not limited to, red, green, black, white, yellow, navy blue, and/or amber. In addition, in one or more embodiments, an attribute within an attribute type of material includes, but is not limited to, wooden, metal, glass, plastic, and/or cardboard. Also, as an example, an attribute within an attribute type of shape includes, but is not limited to, arched, round, square, and/or triangular. Furthermore, in some embodiments, an attribute within an attribute type of texture includes, but is not limited to, rough, smooth, wrinkled, and/or striped. Additionally, in one or more embodiments, an attribute within an attribute type of state includes, but is not limited to, wet, dry, open, closed, broken, and/or messy. Indeed, in some embodiments, attributes also include visual properties such as, but not limited to, graffitied, statue, blurry, transparent, cushioned, gloomy, loose, tight, flat, and/or tilted.

Furthermore, in one or more embodiments, a positive attribute includes an attribute that is visually present in relation to an object portrayed within a digital image. In addition, in one or more embodiments, a negative attribute includes an attribute that is not visually present in relation to an object portrayed within a digital image. For example, for a red car that is portrayed within a digital image, red is a positive attribute and blue is a negative attribute (as the car is not blue).

Figure 3:
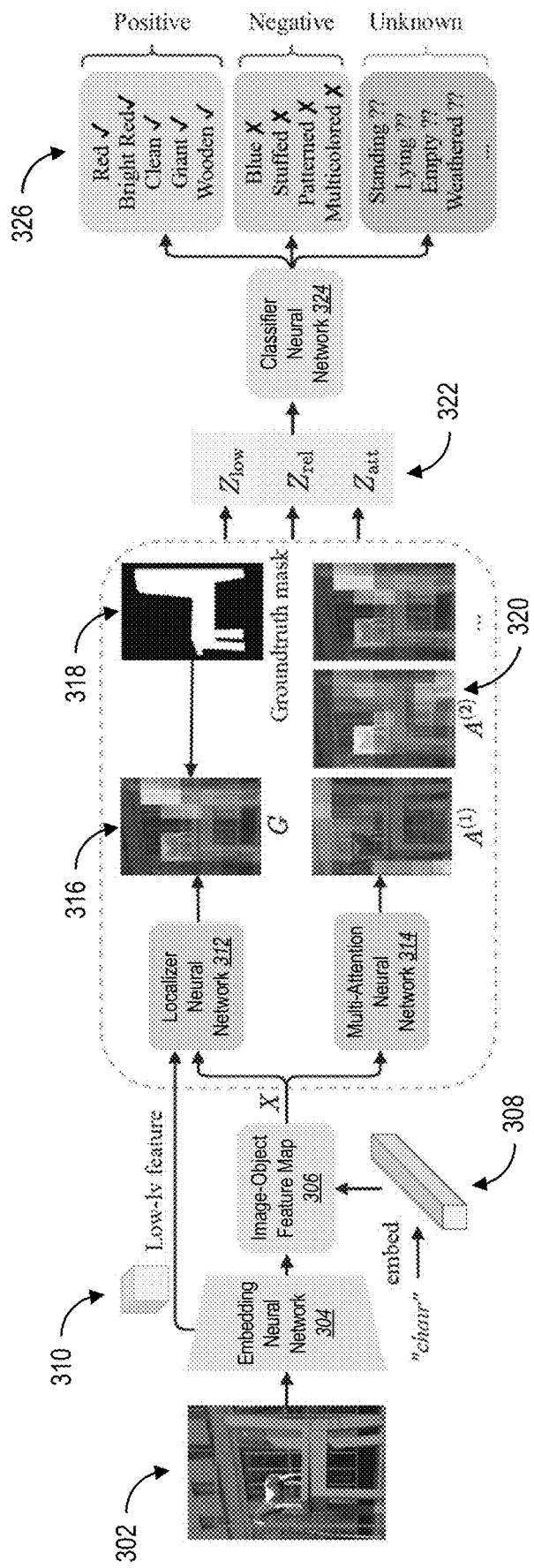
FIG. 3 illustrates an overview of a multi-attribute contrastive classification neural network in accordance with one or more implementations.

As mentioned above, in one or more embodiments, the multi-attribute extraction system 106 utilizes a multi-attribute contrastive classification neural network to extract multiple attribute labels (positive and negative) for one or more objects portrayed in a digital image. For example, FIG. 3 illustrates an overview of a multi-attribute contrastive classification neural network. In particular, FIG. 3 illustrates the multi-attribute extraction system 106 utilizing a multi-attribute contrastive classification neural network to extract a wide variety of attribute labels (e.g., negative, positive, and unknown labels) for an object portrayed within a digital image.

As shown in FIG. 3, the multi-attribute extraction system 106 utilizes an embedding neural network 304 with a digital image 302 to generate an image-object feature map 306 and a low-level attribute feature map 310. In particular, the multi-attribute extraction system 106 generates the image-object feature map 306 (e.g., the image-object feature map X) by combining an object-label embedding vector 308 with a high-level attribute feature map from the embedding neural network 304. For instance, the object-label embedding vector 308 represents an embedding of an object label (e.g., "chair").

Furthermore, as shown in FIG. 3, the multi-attribute extraction system 106 generates a localized object attention feature vector $Z_{rel}$. In particular, the multi-attribute extraction system 106 utilizes the image-object feature map 306 with the localizer neural network 312 to generate the localized object attention feature vector $Z_{rel}$. Specifically, the multi-attribute extraction system 106 combines the image-object feature map 306 with a localized object attention feature vector G to generate the localized object attention feature vector $Z_{rel}$ to reflect a segmentation prediction of the relevant object (e.g., "chair") portrayed in the digital image 302. As further shown in FIG. 3, the localizer neural network 312, in some embodiments, is trained utilizing ground truth object segmentation masks 318.

Additionally, as illustrated in FIG. 3, the multi-attribute extraction system 106 also generates a localized low-level attribute feature vector $Z_{low}$. In particular, in reference to FIG. 3, the multi-attribute extraction system 106 utilizes the localized object attention feature vector G from the localizer neural network 312 with the low-level attribute feature map 310 to generate the localized low-level attribute feature vector $Z_{low}$.

Moreover, as shown FIG. 3, the multi-attribute extraction system 106 generates a multi-attention feature vector $Z_{att}$. As illustrated in FIG. 3, the multi-attribute extraction system 106 generates the multi-attention feature vector $Z_{att}$ from the image-object feature map 306 by utilizing attention maps 320 of the multi-attention neural network 314. Indeed, in one or more embodiments, the multi-attribute extraction system 106 utilizes the multi-attention feature vector $Z_{att}$ to attend to features at different spatial locations in relation to the object portrayed within the digital image 302 while predicting attribute labels for the portrayed object.

As further shown in FIG. 3, the multi-attribute extraction system 106 utilizes a classifier neural network 324 to predict the attribute labels 326 upon generating the localized object attention feature vector $Z_{rel}$, the localized low-level attribute feature vector $Z_{low}$, and the multi-attention feature vector $Z_{att}$. In particular, in one or more embodiments, the multi-attribute extraction system 106 utilizes the classifier neural network 324 with a concatenation of the localized object attention feature vector $Z_{rel}$, the localized low-level attribute feature vector Zio, and the multi-attention feature vector $Z_{att}$ to determine the attribute labels 326 for the object (e.g., chair) portrayed within the digital image 302. As shown in FIG. 3, the multi-attribute extraction system 106 determines positive attribute labels for the chair portrayed in the digital image 302, negative attribute labels that are not attributes of the chair portrayed in the digital image 302, and unknown attribute labels that correspond to attribute labels that the multi-attribute extraction system 106 could not confidently classify utilizing the classifier neural network 324 as belonging to the chair portrayed in the digital image 302.

In some instances, the multi-attribute extraction system 106 utilizes probabilities (e.g., a probability score, floating point probability) output by the classifier neural network 324 for the particular attributes to determine whether the attributes are classified as positive, negative, and/or unknown attribute labels for the object portrayed in the digital image 302 (e.g., the chair). For example, the multi-attribute extraction system 106 identifies an attribute as a positive attribute when a probability output for the particular attribute satisfies a positive attribute threshold (e.g., a positive probability, a probability that is over 0.5). Moreover, the multi-attribute extraction system 106 identifies an attribute as a negative attribute when a probability output for the particular attribute satisfies a negative attribute threshold (e.g., a negative probability, a probability that is below −0.5). Furthermore, in some cases, the multi-attribute extraction system 106 identifies an attribute as an unknown attribute when the probability output for the particular attribute does not satisfy either the positive attribute threshold or the negative attribute threshold.

In one or more embodiments, a neural network includes a machine learning model that can be tuned (e.g., trained) based on training input to approximate unknown functions. For example, a neural network includes a model of interconnected digital neurons that communicate and learn to approximate complex functions and generate outputs based on a plurality of inputs provided to the model. For instance, a neural network includes one or more machine learning algorithms such as, but not limited to, deep convolutional neural networks (CNN) and fully convolutional neural networks (FCN).

In some embodiments, a neural network includes one or more layers (or filters) that generate feature maps. For instance, a feature map includes a spatial-relational construct of an object in terms of activations of neurons of a neural network. In some cases, a feature map includes a height, width, and dimension locations (H×W×D) which have D-dimensional feature vectors at each of the H×W image locations. Furthermore, a feature vector includes a set of values representing characteristics and/or features of content (or an object) within a digital image. Indeed, in some embodiments, a feature vector includes a set of values corresponding to latent and/or patent attributes related to a digital image. For example, a feature vector is a multi-dimensional dataset that represents features depicted within a digital image. In one or more embodiments, a feature vector includes a set of numeric metrics learned by a machine learning algorithm.

Figure 4:
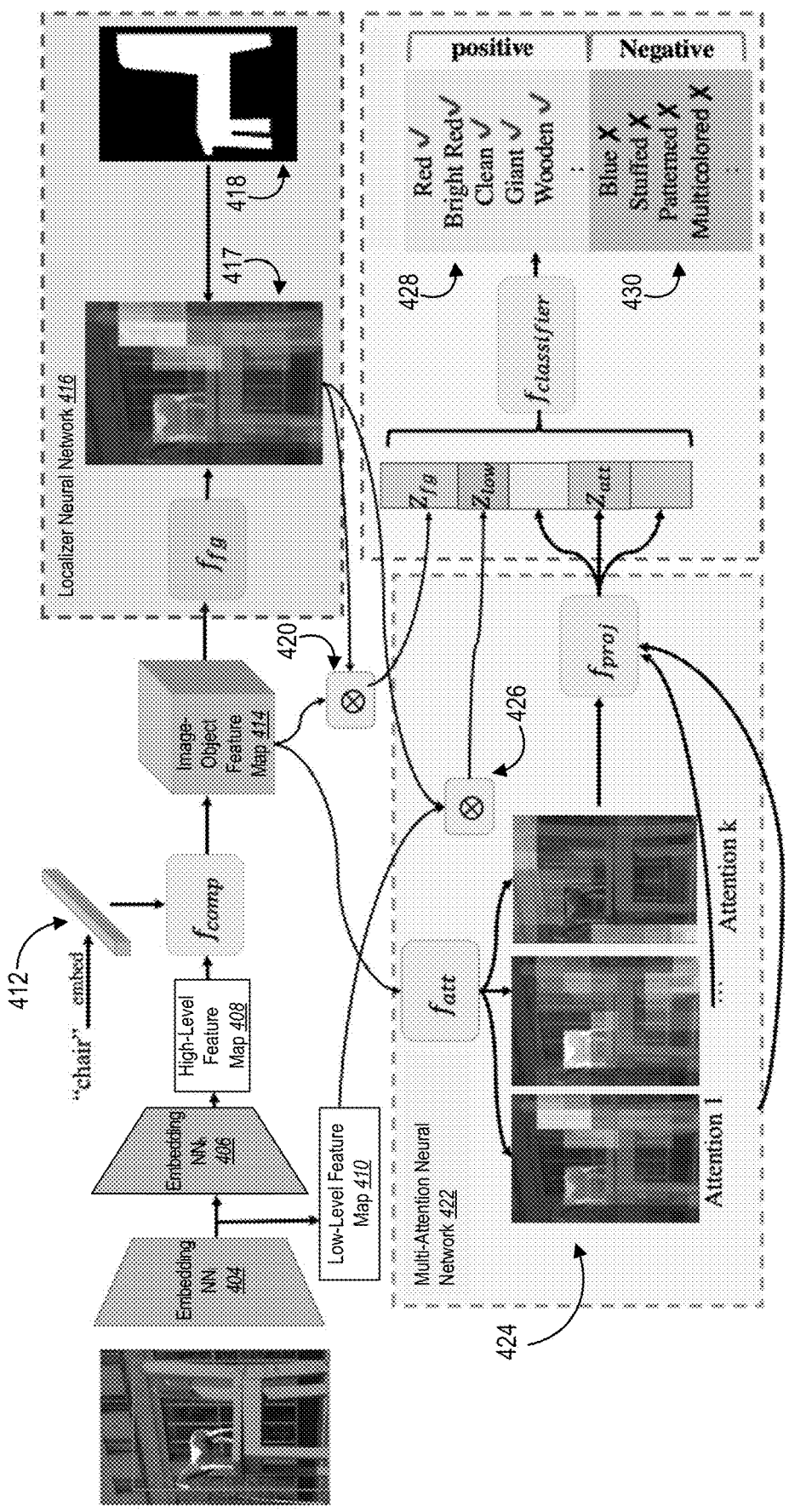
FIG. 4 illustrates an architecture of a multi-attribute contrastive classification neural network utilized by the multi-attribute extraction system in accordance with one or more implementations.

As mentioned above, the multi-attribute extraction system 106 utilizes a multi-attribute contrastive classification neural network that includes an embedding neural network, a localizer neural network, a multi-attention neural network, and a classifier neural network. For example, FIG. 4 illustrates an architecture of the multi-attribute contrastive classification neural network. Indeed, in one or more embodiments, the multi-attribute extraction system 106 utilizes the multi-attribute contrastive classification neural network, as illustrated in FIG. 4, with the embedding neural network, the localizer neural network, the multi-attention neural network, and the classifier neural network components to determine positive and negative attribute labels (e.g., from output attribute presence probabilities) for an object portrayed in a digital image.

As shown in FIG. 4, the multi-attribute extraction system 106 utilizes an embedding neural network within the multi-attribute contrastive classification neural network. In particular, as illustrated in FIG. 4, the multi-attribute extraction system 106 utilizes a low-level embedding layer 404 (e.g., embedding $NN_l$) (e.g., of the embedding neural network 304 of FIG. 3) to generate a low-level attribute feature map 410 from a digital image 402. Furthermore, as shown in FIG. 4, the multi-attribute extraction system 106 utilizes a high-level embedding layer 406 (e.g., embedding $NN_h$) (e.g., of the embedding neural network 304 of FIG. 3) to generate a high-level attribute feature map 408 from the digital image 402.

In particular, in one or more embodiments, the multi-attribute extraction system 106 utilizes a convolutional neural network as an embedding neural network. For example, the multi-attribute extraction system 106 generates a D-dimensional image feature map $f_{img}(I) \in \mathbb{R}^{H \times W \times D}$ with a spatial size H×W extracted from a convolutional neural network-based embedding neural network. In some instance, the multi-attribute extraction system 106 utilizes an output of the penultimate layer of ResNet-50 as the image feature map $f_{img}(I)$.

As shown in FIG. 4, the multi-attribute extraction system 106 extracts both a high-level attribute feature map 408 and a low-level attribute feature map 410 utilizing a high-level embedding layer and a low-level embedding layer of an embedding neural network. By extracting both the high-level attribute feature map 408 and the low-level attribute feature map 410 for the digital image 402, the multi-attribute extraction system 106 addresses the heterogeneity in features between different classes of attributes. Indeed, attributes span across a wide range of semantic levels.

By utilizing both low-level feature maps and high-level feature maps, the multi-attribute extraction system 106 accurately predicts attributes across the wide range of semantic levels. For instance, the multi-attribute extraction system 106 utilizes low-level feature maps to accurately predict attributes such as, but not limited to, colors (e.g., red, blue, multicolored), patterns (e.g., striped, dotted, striped), geometry (e.g., shape, size, posture), texture (e.g., rough, smooth, jagged), or material (e.g., wooden, metallic, glossy, matte) of a portrayed object. Meanwhile, in one or more embodiments, the multi-attribute extraction system 106 utilizes high-level feature maps to accurately predict attributes such as, but not limited to, object states (e.g., broken, dry, messy, full, old) or actions (e.g., running, sitting, flying) of a portrayed object.

Furthermore, as illustrated in FIG. 4, the multi-attribute extraction system 106 generates an image-object feature map 414. In particular, as shown in FIG. 4, the multi-attribute extraction system 106 combines an object-label embedding vector 412 (e.g., such as the object-label embedding vector 308 of FIG. 3) from a label corresponding to the object (e.g., "chair") with the high-level attribute feature map 408 to generate the image-object feature map 414 (e.g., such as the image-object feature map 306 of FIG. 3). As further shown in FIG. 4, the multi-attribute extraction system 106 utilizes a feature composition module (e.g., $f_{comp}$) that utilizes the object-label embedding vector 412 and the high-level attribute feature map 408 to output the image-object feature map 414.

In one or more embodiments, the multi-attribute extraction system 106 generates the image-object feature map 414 to provide an extra signal to the multi-attribute contrastive classification neural network to learn the relevant object for which it is predicting attributes (e.g., while also encoding the features for the object). In particular, in some embodiments, the multi-attribute extraction system 106 incorporates the object-label embedding vector 412 (as an input in a feature composition module $f_{comp}$ to generate the image-object feature map 414) to improve the classification results of the multi-attribute contrastive classification neural network by having the multi-attribute contrastive classification neural network learn to avoid unfeasible object-attribute combinations (e.g., a parked dog, a talking table, a barking couch). Indeed, in some embodiments, the multi-attribute extraction system 106 also utilizes the object-label embedding vector 412 (as an input in the feature composition module $f_{comp}$) to have the multi-attribute contrastive classification neural network learn to associate certain object-attribute pairs together (e.g., a ball is always round). In many instances, by guiding the multi-attribute contrastive classification neural network on what object it is predicting attributes for enables the multi-attribute contrastive classification neural network to focus on particular visual aspects of the object. This, in turn, improves the quality of extracted attributes for the portrayed object.

In one or more embodiments, the multi-attribute extraction system 106 utilizes a feature composition module (e.g., $f_{comp}$) to generate the image-object feature map 414. In particular, the multi-attribute extraction system 106 implements the feature composition module (e.g., $f_{comp}$) with a gating mechanism in accordance with the following functions:

$$f_{comp}(f_{img}(I),\phi_o)=f_{img}(I)\odot f_{gate}(\phi_o) \quad (1)$$

and $$f_{comp}(\phi_o)=\sigma(W_{g2}\cdot \text{ReLU}(W_{g1}\phi_o+b_{g1})+b_{g2}) \quad (2)$$

In function (1) above, the multi-attribute extraction system 106 utilizes a channel-wise product ($\odot$) of the high-level attribute feature map $f_{img}$ (I) and a filter $f_{gate}$ of the object-label embedding vector $\phi_o \in \mathbb{R}^d$ to generate an image-object feature map $f_{comp}$ ($f_{img}$(I), $\phi_o) \in \mathbb{R}^D$.

In addition, in relation to the function (2) above, the multi-attribute extraction system 106 utilizes a sigmoid function a in the $f_{gate}(\phi_o)) \in \mathbb{R}^D$ that is broadcasted to match the feature map spatial dimension as a 2-layer multilayer perceptron (MLP). Indeed, in one or more embodiments, the multi-attribute extraction system 106 utilizes $f_{gate}$ as a filter that selects attribute features that are relevant to the object of interest (e.g., as indicated by the object-label embedding vector $\phi_o$). In many instances, the multi-attribute extraction system 106 also utilizes $f_{gate}$ to suppress incompatible object-attribute pairs (e.g., talking table). In some embodiments, the multi-attribute extraction system 106 can identify object-image labels for each object portrayed within a digital image and output attributes for each portrayed object by utilizing the identified object-image labels with the multi-attribute contrastive classification neural network.

Furthermore, as shown in FIG. 4, the multi-attribute extraction system 106 utilizes the image-object feature map 414 with a localizer neural network 416 to generate a localized image-object feature vector $Z_{rel}$ (e.g., as also shown in FIG. 3 as localizer neural network 312 and $Z_{rel}$). In particular, as shown in FIG. 4, the multi-attribute extraction system 106 generates a localized object attention feature vector 417 (e.g., G in FIG. 3) that reflects a segmentation prediction of the portrayed object by utilizing the image-object feature map 414 with a convolutional layer $f_{rel}$ of the localizer neural network 416. Then, as illustrated in FIG. 4, the multi-attribute extraction system 106 combines the localized object attention feature vector 417 with the image-object feature map 414 to generate the localized image-object feature vector $Z_{rel}$. As shown in FIG. 4, the multi-attribute extraction system 106 utilizes matrix multiplication 420 between the localized object attention feature vector 417 and the image-object feature map 414 to generate the localized image-object feature vector $Z_{rel}$.

In some instances, digital images may include multiple objects (and/or a background). Accordingly, in one or more embodiments, the multi-attribute extraction system 106 utilizes a localizer neural network to learn an improved feature aggregation that suppresses non-relevant-object regions (e.g., regions not reflected in a segmentation prediction of the target object to isolate the target object). For example, in reference to the digital image 402, the multi-attribute extraction system 106 utilizes the localizer neural network to localize an object region such that the multi-attribute contrastive classification neural network predicts attributes for the correct object (e.g., the portrayed chair) rather than other irrelevant objects (e.g., the portrayed horse). To do this, in some embodiments, the multi-attribute extraction system 106 utilizes a localizer neural network that utilizes supervised learning with object segmentation masks (e.g., ground truth relevant-object masks) from a dataset of labeled images (e.g., ground truth images as described below).

To illustrate, in some instances, the multi-attribute extraction system 106 utilizes 2-stacked convolutional layers f (e.g., with a kernel size of 1) followed by a spatial softmax to generate a localized object attention feature vector G (e.g., a localized object region) from an image-object feature map $X \in \mathbb{R}^{H \times W \times D}$ in accordance with the following function:

$$g = f_{rel}(X), g \in \mathbb{R}^{H \times W}, \quad (3)$$

$$G_{h,w} = \frac{\exp(g_h, w)}{\sum_{h,w} \exp(g_h, w)}, G \in \mathbb{R}^{H \times W} \quad (4)$$

For example, the localized object attention feature vector G includes a single plane of data that is H×W (e.g., a feature map having a single dimension). In some instances, the localized object attention feature vector G includes a feature map (e.g., a localized object attention feature map) that includes one or more feature vector dimensions.

Then, in one or more embodiments, the multi-attribute extraction system 106 utilizes the localized object attention feature vector $G_{h,w}$ and the image-object feature map $X_{h,w}$ to generate the localized image-object feature vector $Z_{rel}$ in accordance with the following function:

$$Z_{rel} = \sum_{h,w} G_{h,w} X_{h,w} \quad (5)$$

In some instances, in the above-mentioned function (5), the multi-attribute extraction system 106 pools H×W D-dimensional feature vectors $X_{h,w}$ (from the image-object feature map) in $\mathbb{R}^D$ using weights from the localized object attention feature vector $G_{h,w}$ into a single D-dimensional feature vector $Z_{rel}$.

In one or more embodiments, in reference to FIG. 4, the multi-attribute extraction system 106 trains the localizer neural network 416 to learn the localized object attention feature vector 417 (e.g., G) utilizing direct supervision with object segmentation masks 418 (e.g., ground truth object segmentation masks 318 from FIG. 3). In particular, in some embodiments, the multi-attribute extraction system 106 penalizes the localizer neural network 416 when the segmentation prediction is outside an object segmentation mask (e.g., a ground truth relevant-object mask). In some instances, the multi-attribute extraction system 106 utilizes the object segmentation mask (as described above) to enable the multi-attribute contrastive classification neural network to learn heterogenous attention within a segmentation predicted region of the object (e.g., to determine attributes such as a "black mirror" in which the attribute refers to the mirror's frame being black rather than its interior from a digital image portraying a mirror as an object).

To illustrate, in one or more embodiments, the multi-attribute extraction system 106 identifies a ground truth object segmentation mask M and a positive constant value $\lambda_{rel}$ that encourages the localized object attention feature vector G to avoid non-relevant-object pixels (e.g., pixels outside a segmentation prediction of the relevant object). In some cases, the multi-attribute extraction system 106 utilizes the positive constant value $\lambda_{rel}$ (e.g., in certain instances a positive constant value that is less than 1) to encourage the localized object attention feature vector G to avoid non-relevant-object pixels rather than correctly predicting all relevant-object pixels. Then, in one or more embodiments, the multi-attribute extraction system 106 utilizes the ground truth object segmentation mask M and the positive constant value $\lambda_{rel}$ with a generated localized object attention feature vector G to generate a relevant-object segmentation localizer loss $\mathcal{L}_{rel}$ in accordance with the following loss function:

$$\mathcal{L}_{rel} = \sum_{h,w} (G_{h,w} \times (1 - M_{h,w})) - \lambda_{rel}(G_{h,w} \times M_{h,w}) \quad (6)$$

In certain instances, the multi-attribute extraction system 106 utilizes the relevant-object segmentation localizer loss $\mathcal{L}_{rel}$ to learn parameters of the localizer neural network 416 and/or the multi-attribute contrastive classification neural network (e.g., via back-propagation or other machine learning techniques to reduce the measure of loss).

Furthermore, as shown in FIG. 4, the multi-attribute extraction system 106 utilizes the image-object feature map 414 with a multi-attention neural network 422 to generate a multi-attention feature vector $Z_{att}$ (e.g., the multi-attention neural network 314 and $Z_{att}$ of FIG. 3). In particular, as shown in FIG. 4, the multi-attribute extraction system 106 utilizes a convolutional layer $f_{att}$ (e.g., attention layers) with the image-object feature map 414 to extract attention maps 424 (e.g., Attention 1 through Attention k) (e.g., attention maps 320 of FIG. 3). Then, as further shown in FIG. 4, the multi-attribute extraction system 106 passes (e.g., via linear projection) the extracted attention maps 424 (attention 1 through attention k) through a projection layer $f_{proj}$ to extract one or more attention features that are utilized to generate the multi-attention feature vector $Z_{att}$.

In one or more embodiments, the multi-attribute extraction system 106 utilizes the multi-attention feature vector $Z_{att}$ to accurately predict attributes of a portrayed object within a digital image by providing focus to different parts of the portrayed object and/or regions surrounding the portrayed object (e.g., attending to features at different spatial locations). To illustrate, in some instances, the multi-attribute extraction system 106 utilizes the multi-attention feature vector $Z_{att}$ to extract attributes such as "barefooted" or "bald-headed" by focusing on different parts of a person (i.e., an object) that is portrayed in a digital image. Likewise, in some embodiments, the multi-attribute extraction system 106 utilizes the multi-attention feature vector $Z_{att}$ to distinguish between different activity attributes (e.g., jumping vs crouching) that may rely on information from surrounding context of the portrayed object.

In certain instances, the multi-attribute extraction system 106 generates an attention map per attribute portrayed for an object within a digital image. For example, the multi-attribute extraction system 106 utilizes an image-object feature map with one or more attention layers to generate an attention map from the image-object feature map for each known attribute. Then, the multi-attribute extraction system 106 utilizes the attention maps with a projection layer to generate the multi-attention feature vector $Z_{att}$. In one or more embodiments, the multi-attribute extraction system 106 generates various numbers of attention maps for various attributes portrayed for an object within a digital image (e.g., the system can generate an attention map for each attribute or a different number of attention maps than the number of attributes).

Furthermore, in one or more embodiments, the multi-attribute extraction system 106 utilizes a hybrid shared multi-attention approach that allows for attention hops while generating the attention maps from the image-object feature map. For example, the multi-attribute extraction system 106 extracts M attention maps $\{A^{(m)}\}_{m=1}^{M}$ from an image-object feature map X utilizing a convolutional layer $f_{att}^{(m)}$ (e.g., attention layers) in accordance with the following function:

$$E^{(m)} = f_{att}^{(m)}(X), E^{(m)} \in \mathbb{R}^{H \times W}, m = 1, \ldots, M \quad (7)$$

and $$A_{h,w}^{(m)} = \frac{\exp(E_{h,w}^{(m)})}{\sum_{h,w} \exp(E_{h,w}^{(m)})}, A_{h,w}^{(m)} \in \mathbb{R}^{H \times W} \quad (8)$$

In some cases, the multi-attribute extraction system 106 utilizes a convolutional layer $f_{att}^{(m)}$ that has a similar architecture to the 2-stacked convolutional layers $f_{rel}$ from function (3) above. By utilizing the approach outlined in function (8), the multi-attribute extraction system 106 utilizes a diverse set of attention maps that correspond to a diverse range of attributes.

Subsequently, in one or more embodiments, the multi-attribute extraction system 106 utilizes the M attention maps (e.g., $A_{h,w}^{(m)}$) to aggregate M attention feature vectors ($\{r^{(m)}\}_{m=1}^{M}$) from the image-object feature map X in accordance with the following function:

$$r^{(m)} = \sum_{h,w} A_{h,w}^{(m)} X_{h,w}, r^{(m)} \in \mathbb{R}^D \qquad (9)$$

Moreover, in reference to FIG. 4, the multi-attribute extraction system 106 passes the M attention feature vectors ($\{r^{(m)}\}_{i=1}^{M}$) through a projection layer $f_{proj}^{(m)}$ to extract one or more attention feature vectors $z^{(m)}$ in accordance with the following function:

$$z_{att}^{(m)} = f_{proj}^{(m)}(r^{(m)})), z_{att}^{(m)} \in \mathbb{R}^{D_{proj}} \qquad (10)$$

Then, in one or more embodiments, the multi-attribute extraction system 106 generates the multi-attention feature vector $Z_{att}$ by concatenating the individual attention feature vectors $z_{att}^{(m)}$ in accordance with the following function:

$$Z_{att} = \text{concat}([z_{att}^{(1)}, \ldots, z_{att}^{(M)}]) \qquad (11)$$

In some embodiments, the multi-attribute extraction system 106 utilizes a divergence loss with the multi-attention neural network in the M attention hops approach. In particular, the multi-attribute extraction system 106 utilizes a divergence loss that encourages attention maps to focus on different (or unique) regions of a digital image (from the image-object feature map). In some cases, the multi-attribute extraction system 106 utilizes a divergence loss that promotes diversity between attention features by minimizing a cosine similarity (e.g., $\ell_2$-norm) between attention weight vectors (e.g., E) of attention features. For instance, in relation to function (8), the multi-attribute extraction system 106 determines a divergence loss $\mathcal{L}_{div}$ in accordance with the following function:

$$\mathcal{L}_{div} = \sum_{m \neq n} \frac{\langle E^{(m)}, E^{(n)} \rangle}{\|E^{(m)}\|_2 \|E^{(n)}\|_2} \qquad (12)$$

In one or more embodiments, the multi-attribute extraction system 106 utilizes the divergence loss $\mathcal{L}_{div}$ to learn parameters of the multi-attention neural network 422 and/or the multi-attribute contrastive classification neural network (as a whole).

Furthermore, as shown in FIG. 4, the multi-attribute extraction system 106 also generates a localized low-level attribute feature vector $Z_{low}$ (e.g., $Z_{low}$ of FIG. 3). Indeed, as illustrated in FIG. 4, the multi-attribute extraction system 106 generates the localized low-level attribute feature vector $Z_{low}$ by combining the low-level attribute feature map 410 and the localized object attention feature vector 417. For example, as shown in FIG. 4, the multi-attribute extraction system 106 combines the low-level attribute feature map 410 and the localized object attention feature vector 417 utilizing matrix multiplication 426 to generate the localized low-level attribute feature vector $Z_{low}$.

By generating and utilizing the localized low-level attribute feature vector $Z_{low}$, in one or more embodiments, the multi-attribute extraction system 106 improves the accuracy of low-level features (e.g., colors, materials) that are extracted for an object portrayed in a digital image. In particular, in one or more embodiments, the multi-attribute extraction system 106 pools low-level features (as represented by a low-level attribute feature map from a low-level embedding layer) from a localized object attention feature vector (e.g., from a localizer neural network). Indeed, in one or more embodiments, by pooling low-level features from the localized object attention feature vector utilizing a low-level feature map, the multi-attribute extraction system 106 constructs a localized low-level attribute feature vector $Z_{low}$.

As further shown in FIG. 4, the multi-attribute extraction system 106 utilizes a classifier neural network ($f_{classifier}$) (e.g., the classifier neural network of FIG. 3) with the localized image-object feature vector $Z_{rel}$, the multi-attention feature vector $Z_{att}$, and the localized low-level attribute feature vector $Z_{low}$ to determine positive attribute labels 428 and negative attribute labels 430 for the object (e.g., "chair") portrayed within the digital image 402. In some embodiments, the multi-attribute extraction system 106 utilizes a concatenation of the localized image-object feature vector $Z_{rel}$, the multi-attention feature vector $Z_{att}$, and the localized low-level attribute feature vector $Z_{low}$ as input in a classification layer of the classifier neural network ($f_{classifier}$) Then, as shown in FIG. 4, the classifier neural network ($f_{classifier}$) generates positive attribute labels 428 (e.g., red, bright red, clean, giant, wooden) and also generates negative attribute labels 430 (e.g., blue, stuffed, patterned, multicolored) for the portrayed object in the digital image 402.

In one or more embodiments, the multi-attribute extraction system 106 utilizes a classifier neural network that is a 2-layer MLP. In some cases, the multi-attribute extraction system 106 utilizes a classifier neural network that includes various amounts of hidden units and output logic values followed by sigmoid. In some embodiments, the classifier neural network is trained by the multi-attribute extraction system 106 to generate both positive and negative attribute labels. Although one or more embodiments described herein utilize a 2-layer MLP, in some instances, the multi-attribute extraction system 106 utilizes a linear layer (e.g., within the classifier neural network, for the $f_{gate}$, and for the image-object feature map).

Furthermore, in one or more embodiments, the multi-attribute extraction system 106 utilizes various combinations of the localized image-object feature vector $Z_{rel}$, the multi-attention feature vector $Z_{att}$, and the localized low-level attribute feature vector $Z_{low}$ with the classifier neural network to extract attributes for an object portrayed in a digital image. For example, in certain instances, the multi-attribute extraction system 106 provides the localized image-object feature vector $Z_{rel}$ and the multi-attention feature vector $Z_{att}$ to extract attributes for the portrayed object. In some instances, as shown in FIG. 4, the multi-attribute extraction system 106 utilizes a concatenation of each the localized image-object feature vector $Z_{rel}$, the multi-attention feature vector $Z_{att}$, and the localized low-level attribute feature vector $Z_{low}$ with the classifier neural network.

In one or more embodiments, the multi-attribute extraction system 106 utilizes the classifier neural network to generate prediction scores corresponding to attribute labels as outputs. For, example, the classifier neural network can generate a prediction score for one or more attribute labels (e.g., a score of 0.04 for blue, a score of 0.9 for red, a score of 0.4 for orange). Then, in some instances, the multi-attribute extraction system 106 utilizes attribute labels that correspond to prediction scores that satisfy a threshold prediction score. Indeed, in one or more embodiments, the multi-attribute extraction system 106 selects various attribute labels (both positive and negative) by utilizing output prediction scores for attributes from a classifier neural network.

Although one or more embodiments herein illustrate the multi-attribute extraction system 106 utilizing a particular embedding neural network, localizer neural network, multi-attention neural network, and classifier neural network, the multi-attribute extraction system 106 can utilize various types of neural networks for these components (e.g., CNN, FCN). In addition, although one or more embodiments herein describe the multi-attribute extraction system 106 combining various feature maps (and/or feature vectors) utilizing matrix multiplication, the multi-attribute extraction system 106, in some embodiments, utilizes various approaches to combine feature maps (and/or feature vectors) such as, but not limited to, concatenation, multiplication, addition, and/or aggregation. For example, in some implementations, the multi-attribute extraction system 106 combines a localized object attention feature vector and an image-object feature map to generate the localized image-object feature vector by concatenating the localized object attention feature vector and the image-object feature map.

As mentioned above, in one or more embodiments, the multi-attribute extraction system 106 utilizes a dataset of labeled images with an expanded set of negative attribute labels. In one or more embodiments, the multi-attribute extraction system 106 utilizes a dataset of labeled images that includes a high density of attribute labels (and segmentation masks). In addition, the multi-attribute extraction system 106 utilizes positive attribute labels corresponding to the dataset of labeled images to increase the number of negative attribute labels within the dataset of labeled images. For example, FIG. 5 illustrates the multi-attribute extraction system 106 utilizing a dataset of labeled images to increase the number of negative attribute labels within the dataset of labeled images in accordance with one or more embodiments.

Figure 5:
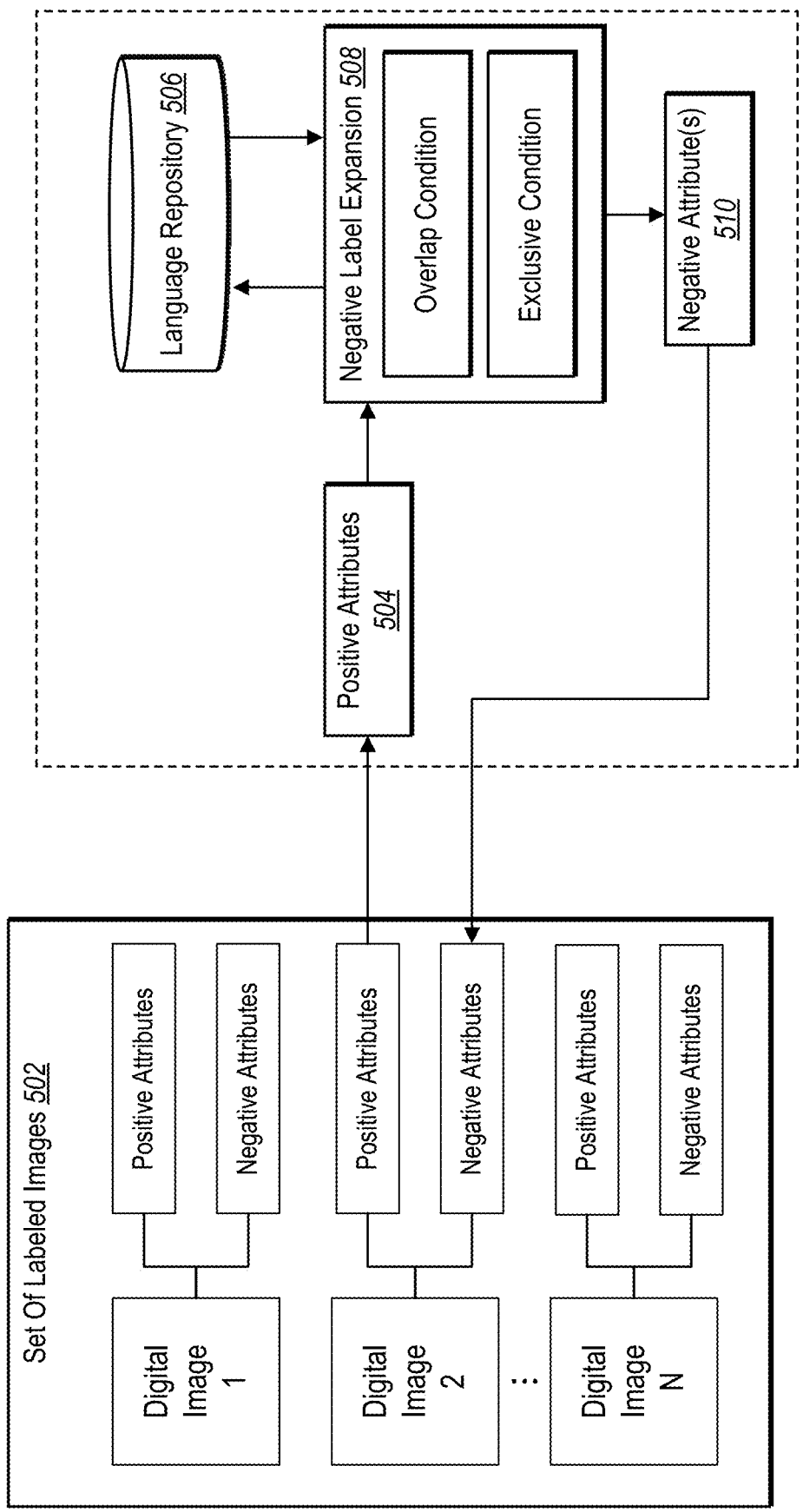
FIG. 5 illustrates the multi-attribute extraction system utilizing a dataset of labeled images to increase the number of negative attribute labels in accordance with one or more implementations.

As shown in FIG. 5, the dataset of labeled images 502 includes digital image I through digital image N. In addition, as shown in FIG. 5, each digital image in the dataset of labeled images 502 includes corresponding positive attributes and negative attributes. In one or more embodiments, the positive and negative attributes for the dataset of labeled images 502 correspond to various numbers of objects portrayed within the digital images.

In some embodiments, the multi-attribute extraction system 106 generates a dataset of labeled images that includes attribute annotations for digital images that are captured in unconstrained settings where object occlusion, complicated backgrounds, and/or diverse lighting conditions are present. In addition, the multi-attribute extraction system 106 generates the dataset of labeled images by extracting attributes from existing datasets of labeled images, utilizing a sparse label expansion approach, and a long-tailed attribute expansion approach to avoid noisy annotations, label sparsity, and lack of negative labels.

To illustrate, in one or more embodiments, the multi-attribute extraction system 106 identifies existing datasets of labeled images. For example, in some cases, the multi-attribute extraction system 106 utilizes images and annotations from datasets such as, but not limited to, Visual Genome, a referring expression dataset that provides high-quality attribute labels and per-instance segmentation masks (e.g., VGPhraseCut), or a visual question answering dataset that presents clean scene graph annotations (e.g., GQA dataset). From the existing datasets of labeled images, the multi-attribute extraction system 106 extracts attributes that appear within more than a threshold number of phrases or object-attribute pairings from the existing dataset of labeled images. Then, in some cases, the multi-attribute extraction system 106 utilizes the attribute labels associated with the existing dataset of labeled images to generate negative attribute labels. For instance, the multi-attribute extraction system 106 utilizes attribute labels that are utilized in an object category, that corresponds to a portrayed object in a given labeled image, but are not selected for the portrayed object as negative attribute labels. Additionally, in some embodiments, the multi-attribute extraction system 106 removes ambiguous and unrecognizable attribute labels from the labeled images (e.g., married, healthy).

Furthermore, in some embodiments, the multi-attribute extraction system 106 collects additional annotations for feasible attribute-object pairs (from the existing dataset of labeled images) that do not satisfy a threshold number of annotated attribute labels. In particular, in one or more embodiments, the multi-attribute extraction system 106 identifies feasible attribute-object pairs by identifying labeled images that include at least one positive attribute label. Then, the multi-attribute extraction system 106 collects annotations for the feasible attribute-object pairs until the feasible attribute-object pairs satisfy the threshold number of annotated attribute labels.

Additionally, in one or more embodiments, the multi-attribute extraction system 106 further expands attribute labels in the existing dataset of labeled images by expanding long-tailed attributes within the dataset. In certain instances, the multi-attribute extraction system 106 identifies long-tailed attributes as attributes that include less than a threshold number of positive attribute labels (e.g., less than 15). In some cases, these long-tailed attributes are associated with very few object categories (e.g., infrequently used). In one or more embodiments, the multi-attribute extraction system 106 identifies an object associated with the long-tailed attribute and then expands the set of possible objects that the long-tailed attribute can be applied by utilizing an objects ontology (e.g., WordNet, ConceptNetAPI, a lexical database of the English language). For example, the multi-attribute extraction system 106 identifies that "playing" as a long-tailed attribute is applied to child in an existing dataset of labeled images and that it can also be applicable to other related object categories such as "man," "woman," "boy," "girl," or "person." Then, in one or more embodiments, the multi-attribute extraction system 106 collects annotations of the long-tailed attribute (e.g., positive and/or negative) for images (e.g., randomly sampled) from the identified applicable object categories. As another example, when "messy" (e.g., an attribute) is associated with table (e.g., an object), the multi-attribute extraction system 106 determines that "messy" also is applicable to desk, bed, chair, and furniture.

In one or more instances, the generated dataset of labeled images (e.g., utilizing an extraction of attributes from existing datasets of labeled images, utilizing a sparse label expansion approach, and a long-tailed attribute expansion approach as described above) includes over 600 attributes that describe over 250,000 instances from over 71,000 digital images (with over 349,000 positive attribute labels and over 519,000 negative attribute labels). For example, the generated dataset of labeled images utilized by the multi-attribute extraction system 106 is diverse across different categories, including color, material, shape, size, texture, action, and others.

As mentioned above, in one or more embodiments, the multi-attribute extraction system 106 also utilizes a negative label expansion algorithm to generate one or more negative attribute labels for the dataset of labeled images. For example, as shown in FIG. 5, the multi-attribute extraction system 106 utilizes positive attributes 504 from digital image 2 of the set of labeled images 502 to generate negative attribute(s) 510. As illustrated in FIG. 5, the multi-attribute extraction system 106 references a language repository 506 to find relations between the positive attributes 504 and other attributes utilizing an overlap condition and/or an exclusive condition within the negative label expansion act 508. Then, as shown in FIG. 5, the multi-attribute extraction system 106 associates the negative attribute(s) 510 with the digital image 2 (e.g., the same digital image that corresponds to the positive attributes 504).

In particular, in some embodiments, the multi-attribute extraction system 106 utilizes linguistic and external language knowledge tools to expand the number of negative attribute labels within a dataset of labeled images. For example, the multi-attribute extraction system 106 identifies overlapping and/or exclusive relationships for attributes to expand negative attribute labels. To illustrate, the multi-attribute extraction system 106, for a given attribute type (e.g., a material, state), identifies overlapping relations between some other attributes due to their visual similarity or a hierarchical relationship (e.g., wooden overlaps with wicker). In addition, in some cases, the multi-attribute extraction system 106, for a given attribute type, identifies exclusive relations where two attributes cannot appear on the same object (e.g., wet vs. dry, new vs. old).

For example, the multi-attribute extraction system 106 utilizes overlapping and/or exclusive relationships to identify (or generate) negative attribute labels from one or more existing positive attribute labels. To illustrate, in some embodiments, the multi-attribute extraction system 106 identifies a negative attribute label by: (1) including exclusive labels relative to an existing positive attribute label and/or (2) excluding overlapping labels relative to the existing positive attribute label. More specifically, for an object labeled with attribute a E A (e.g., A being a set of attributes from a language repository), the multi-attribute extraction system 106, in some embodiments, generates negative labels for the object utilizing the following set:

$$\{a' \in A | \neg \text{overlap}(a,a') \lor \text{exclusive}(a,a')\} \quad (13)$$

In this manner, the multi-attribute extraction system 106 identifies a negative attribute label (e.g., an attribute or trait that is not portrayed in relation to an object of a digital image) based on a positive attribute label that is already applied to the object of the digital image.

In some embodiments, the multi-attribute extraction system 106 classifies attributes into types and constructs their overlapping and exclusive relations utilizing a language ontology (e.g., a language repository). For instance, the multi-attribute extraction system 106 utilizes a language ontology such as, but not limited to, WordNet hierarchies, relation edges from ConceptNETAPI, or relations from a visual concept-metaconcept learner. In certain cases, the multi-attribute extraction system 106 also expands overlapping relations based on the co-occurrence by utilizing conditional probabilities of the co-occurrence of attribute pairs. As an example, the multi-attribute extraction system 106 identifies that an attribute label of "white" and "beige" are similar and utilizes the two as co-occurring attributes during expansion. In some embodiments, the multi-attribute extraction system 106 also utilizes the negative attribute labels from the expansion approach to discover relationships with existing attributes in the dataset of labeled images to a new attribute class to tag negative attribute labels in the new attribute class. In some instances, by utilizing a negative attribute label expansion approach as described above, the multi-attribute extraction system 106 adds approximately 5.9 million highly accurate negative annotations to the dataset of labeled images.

As mentioned above, in one or more embodiments, the multi-attribute extraction system 106 trains the multi-attribute contrastive classification neural network to determine attributes (e.g., positive attribute labels and/or negative attribute labels). In some instances, the multi-attribute extraction system 106 utilizes a dataset $\mathcal{D}$ of N training samples (e.g., a dataset of labeled images as described above) in accordance with the following formulation:

$$\mathcal{D} = \{I_i, g_i, o_i; Y_i\}_{i=1}^{N} \quad (14)$$

In the formulation (14) above, the multi-attribute extraction system 106 represents digital images portraying objects as segmentation masks (e.g., ground truth relevant-object masks) as $g_i$, and $o_i$ as a category phrase of an object (e.g., that corresponds to the object-label embedding vector). Additionally, in reference to formulation (14) above, the multi-attribute extraction system 106 utilizes a C-class label vector $Y_i = [y_{i,1}, \ldots, y_{i,C}]$ in which $y_c \in \{1, 0, -1\}$ that denotes whether an attribute c is positive, negative, or missing respectively.

In some embodiments, the multi-attribute extraction system 106 trains the multi-attribute contrastive classification neural network to, given an input digital image and an object label, determine one or more attribute labels for an object portrayed in the input digital image. In some cases, the multi-attribute extraction system 106 trains the multi-attribute contrastive classification neural network to output a confidence score for each of the C attribute labels with respect to formulation (14). Furthermore, in one or more embodiments, to train the multi-attribute contrastive classification neural network, the multi-attribute extraction system 106 utilizes a multi-attribute, supervised contrastive loss and/or a reweighted binary cross-entropy loss (as described in greater detail below).

Figure 6:
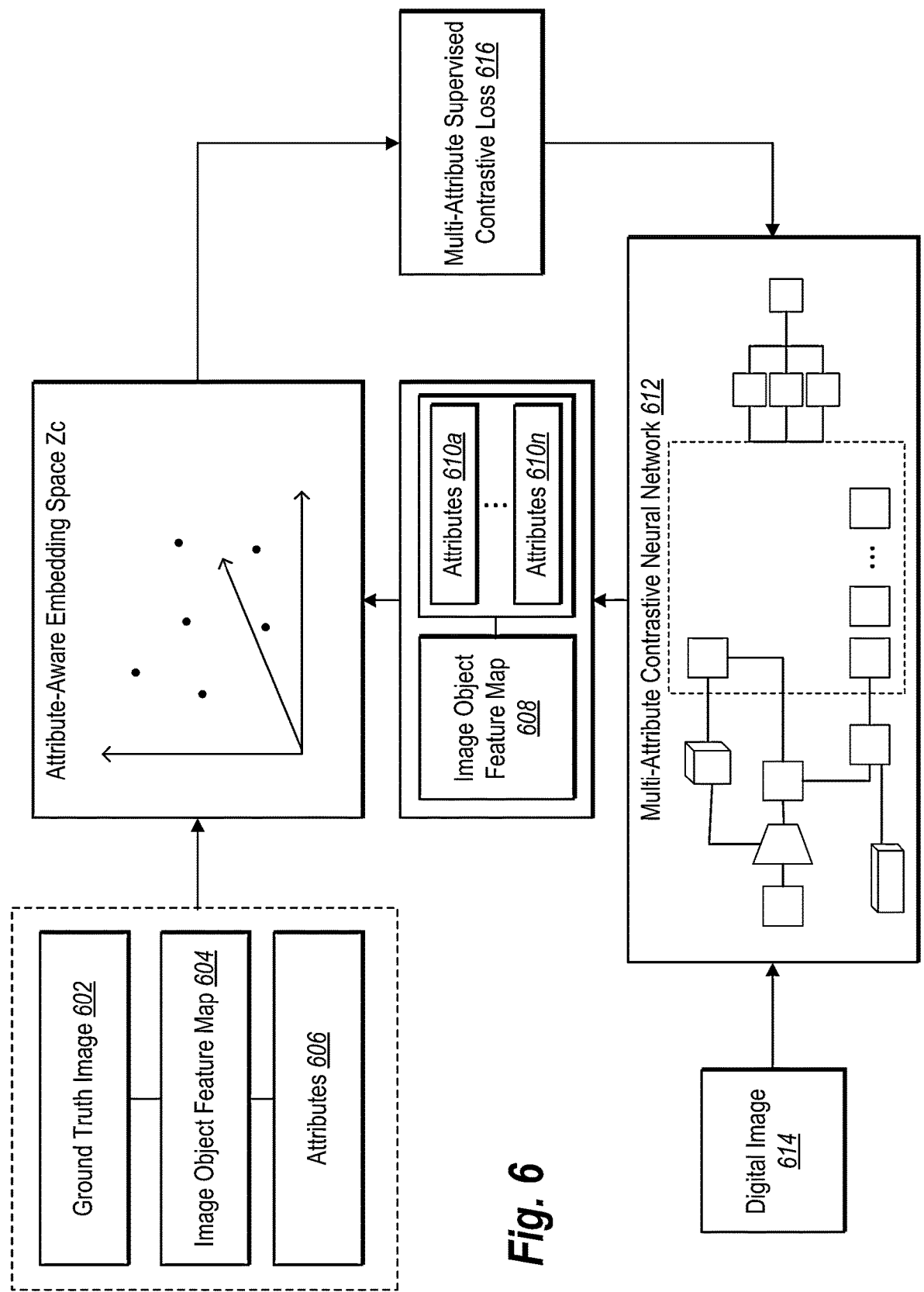
FIG. 6 illustrates the multi-attribute extraction system utilizing a multi-attribute, supervised contrastive loss with a multi-attribute contrastive classification neural network in accordance with one or more implementations.

As just mentioned, in one or more embodiments, the multi-attribute extraction system 106 utilizes a multi-attribute, supervised contrastive loss to train the multi-attribute contrastive classification neural network. For example, FIG. 6 illustrates the multi-attribute extraction system 106 determining and utilizing a multi-attribute, supervised contrastive loss to train the multi-attribute contrastive classification neural network. As shown in FIG. 6, the multi-attribute extraction system 106 embeds an image-object feature map 604 that corresponds to a ground truth image 602 having attributes 606 into an attribute-aware embedding space $Z_c$.

In addition, as shown in FIG. 6, the multi-attribute extraction system 106 also utilizes the multi-attribute contrastive classification neural network 612 to generate an image-object feature map 608 and predicted attributes 610a-610n for an input digital image 614. For example, the multi-attribute extraction system 106 utilizes an input digital image 614 that portrays a similar object or the same object as the ground truth image 602 or, in some cases, is the same digital image as the ground truth image 602. As illustrated in FIG. 6, the multi-attribute extraction system 106 also embeds the image-object feature map 608 with the predicted attributes 610a-610n into the attribute-aware embedding space $Z_c$. In one or more embodiments, the predicted attributes 610a-610n overlap with the attributes 606 (e.g., the two sets of attributes include similar attribute classes and/or similar attribute labels).

Furthermore, as shown in FIG. 6, the multi-attribute extraction system 106 determines the multi-attribute supervised contrastive loss 616 from the attribute-aware embedding space $Z_c$ that includes the embedded image-object feature map 604 (and corresponding attributes 606) and the embedded image-object feature map 608 (and corresponding predicted attributes 610a-610n). Indeed, in some cases, the multi-attribute extraction system 106 compares the embedded image-object feature map 604 (corresponding to an object) and the embedded image-object feature map 608 (corresponding to a similar object) along dimensions that correspond to the attributes (e.g., attributes 606 and predicted attributes 610a-610n) within the attribute-aware embedding space $Z_c$.

As shown in FIG. 6, upon determining the multi-attribute supervised contrastive loss 616, the multi-attribute extraction system 106 utilizes the multi-attribute supervised contrastive loss 616 with the multi-attribute contrastive classification neural network 612. In particular, in one or more embodiments, the multi-attribute extraction system 106 utilizes the multi-attribute supervised contrastive loss 616 to learn parameters of the multi-attribute contrastive classification neural network 612 (e.g., by backpropagating to reduce the measure of loss across various training iterations). Indeed, in one or more embodiments, the multi-attribute extraction system 106 iteratively determines the multi-attribute supervised contrastive loss 616 to learn parameters of the multi-attribute contrastive classification neural network 612.

For example, the multi-attribute extraction system 106 utilizes a multi-attribute, supervised contrastive loss from a multi-label setting that avoids strong label biases due to data imbalances in labeled classes within training digital images in the multi-attribute contrastive classification neural network. More specifically, in one or more embodiments, the multi-attribute extraction system 106 utilizes a multi-attribute, supervised contrastive loss that enables the multi-attribute contrastive classification neural network to learn attribute discriminative features. As an example, while training the multi-attribute contrastive classification neural network using a batch of images, the multi-attribute extraction system 106 samples a flying and a non-flying bird to contrast them against each other to determine a multi-attribute, supervised contrastive loss.

Indeed, in one or more embodiments, the multi-attribute extraction system 106 utilizes the multi-attribute supervised contrastive loss to pull objects with the same attributes closer in their respective attribute space. For example, the multi-attribute extraction system 106 projects an object into a "red" attribute space (e.g., a specific attribute space) such that different objects that share the attribute "red" should be closer to each other in the "red" attribute space (or dimension) compared to objects that do not share the "red" attribute. Furthermore, in one or more instances, the multi-attribute extraction system 106 applies the multi-attribute supervised contrastive loss on a per-attribute basis (e.g., rather than on an overall class of an object) to pull together objects that share the multiple attributes. For instance, instead of pulling together the object "dogs", the multi-attribute extraction system 106 projects "dogs" into different spaces (e.g., on a per-attribute basis) and pulls together "red dog" with other dogs that share the attribute of red.

To illustrate, in one or more embodiments, the multi-attribute extraction system 106 performs mean-pooling inside an image-object feature map $X \in \mathbb{R}^{H \times W \times D}$ to obtain $x \in \mathbb{R}^D$. Then, in one or more embodiments, the multi-attribute extraction system 106 utilizes a projection layer to map the features x into an embedding map $z=\text{Proj}(x) \in \mathbb{R}^{128}$. In some embodiments, the multi-attribute extraction system 106 utilizes an MLP with a number of hidden units as the projection layer.

Furthermore, during supervised contrastive learning in a multi-label setting, the multi-attribute extraction system 106 pulls two different samples together within an attribute-aware embedding space even when the two samples may include some similar attribute labels and may also include dissimilar attribute labels. In order to do so, in one or more embodiments, the multi-attribute extraction system 106 represents a number of attribute labels c as a matrix operator $A_c \in \mathbb{R}^{128 \times 128}$ that linearly projects the embedding map z into an attribute-aware embedding space $Z_c=A_c z$. Utilizing the attribute-aware embedding space $Z_c$, in one or more embodiments, the multi-attribute extraction system 106 decreases the distances between attribute-aware embeddings of samples (e.g., pulls together) that have a shared attribute a.

Moreover, utilizing the attribute-aware embedding space $Z_c$, in one or more embodiments, the multi-attribute extraction system 106 determines a multi-attribute, supervised contrastive loss $\mathcal{L}_{sup}$. In particular, in certain instances, the multi-attribute extraction system 106 constructs a batch of 2N image sample/label vector pairs $\{I_i, Y_i\}_{i=1}^{2N}$ (e.g., from ground truth labeled digital images). In the above-mentioned image sample/label vector pairs, in one or more embodiments, the multi-attribute extraction system 106 represents two views of the same digital image (e.g., the two views portray a similar object, the same object from different perspectives, or the same object from the same perspective) as $I_{2k}$ and $I_{2k-1}$ in which (k=1 . . . N) and represents the labels as $Y_{2k}=Y_{2k-1}$. In some instances, the multi-attribute extraction system 106 utilizes random augmentation to generate the two views of the same digital image.

Subsequently, in one or more embodiments, for a c-attribute-aware embedding of image $I_i$ and $B(i)=\{c \in C: Y_{i,c}=1\}$ as a set of positive attributes of image $I_i$, the multi-attribute extraction system 106 determines a multi-attribute, supervised contrastive loss $\mathcal{L}_{sup}$ in accordance with the following function:

$$\mathcal{L}_{sup} = \sum_{i=1}^{2N} \sum_{c=B(i)}^{C} \frac{-1}{|P(i,c)|} \sum_{p \in P(i,c)} \log \frac{\exp(z_{i,c} \cdot z_{p,c}/\tau)}{\sum_{j \in A(i)} \exp(z_{i,c} \cdot z_{j,c}/\tau)} \quad (15)$$

In function (15) above, the multi-attribute extraction system 106 represents $K \equiv \{1 \ldots 2N\}$ and $A(i) \equiv K \setminus \{i\}$. Moreover, in relation to the function (15) above, the multi-attribute extraction system 106, in some embodiments, represents $P(i,c) \equiv \{p \in A(i): Y_{p,c}=Y_{i,c}\}$. In some instances, the multi-attribute extraction system 106 determines a multi-attribute, supervised contrastive loss $\mathcal{L}_{sup}$ (e.g., in relation to the function (15)) by utilizing the attribute-aware embedding space $Z_c$ across multiple attribute dimensions (as described above) with a supervised-contrastive loss approach as described by Khosla et al. in Supervised Contrastive Learning, arXiv:2004.11362v5, (2021), the content of which is hereby incorporated by reference in its entirety.

Indeed, in the function (15) above, the multi-attribute extraction system 106 utilizes a linear transformation using the matrix operator $A_c$ followed by a dot product in the multi-attribute, supervised contrastive loss $\mathbb{R}_{sup}$ to implement an inner product in the embedding space of z. In some cases, the multi-attribute extraction system 106 utilizes the inner product as finding part of z that encodes the attribute c. As such, in some embodiments, the multi-attribute extraction system 106 encodes multiple attribute labels that are probed utilizing linear transformations for contrasting in the multi-attribute, supervised contrastive loss.

In some embodiments, the multi-attribute extraction system 106 determines and utilizes the multi-attribute, supervised contrastive loss within a pre-training stage of a multi-attribute contrastive classification neural network. In particular, in one or more embodiments, the multi-attribute extraction system 106 randomly initializes parameters of the multi-attribute contrastive classification neural network. Then, in some embodiments, the multi-attribute extraction system 106 iteratively determines the multi-attribute, supervised contrastive loss and utilizes the multi-attribute, supervised contrastive loss to learn parameters from the randomly initialized parameters of the multi-attribute contrastive classification neural network. Moreover, in one or more embodiments, upon pre-training the multi-attribute contrastive classification neural network with the multi-attribute, supervised contrastive loss, the multi-attribute extraction system 106 keeps various components of the multi-attribute contrastive classification neural network (e.g., the image encoder $f_{img}$ and/or the image-object composition module $f_{comp}$). In some cases, the multi-attribute extraction system 106 pre-trains the multi-attribute contrastive classification neural network utilizing the multi-attribute, supervised contrastive loss to reach a better initialization point by avoiding strong label biases due to data imbalances from labeled classes within training digital images.

Furthermore, in one or more embodiments, the multi-attribute extraction system 106 utilizes the multi-attribute, supervised contrastive loss to train the multi-attribute contrastive classification neural network jointly with one or more other losses. For example, the multi-attribute extraction system 106 utilizes the multi-attribute, supervised contrastive loss jointly with various combinations of a relevant-object segmentation localizer loss $\mathcal{L}_{rel}$ (as described in relation to function (6)), a divergence loss $\mathcal{L}_{div}$ (as described in relation to function (12)), and/or a reweighted binary cross entropy loss $\mathcal{L}_{bce}$ (as described in greater detail below in relation to FIG. 7 and function (22)). For example, the multi-attribute extraction system 106 trains the multi-attribute contrastive classification neural network by minimizing a joint loss $\mathcal{L}$ that includes the above-mentioned losses in accordance with the following function:

$$\mathcal{L} = \mathcal{L}_{bce} + \mathcal{L}_{rel} + \lambda_{div}\mathcal{L}_{div} + \lambda_{sup}\mathcal{L}_{sup} \quad (16)$$

In one or more embodiments, by training utilizing the joint loss $\mathcal{L}$ from the above-mentioned function (16), the multi-attribute extraction system 106 enforces label structure regularization during training of the multi-attribute contrastive classification neural network.

Figure 7:
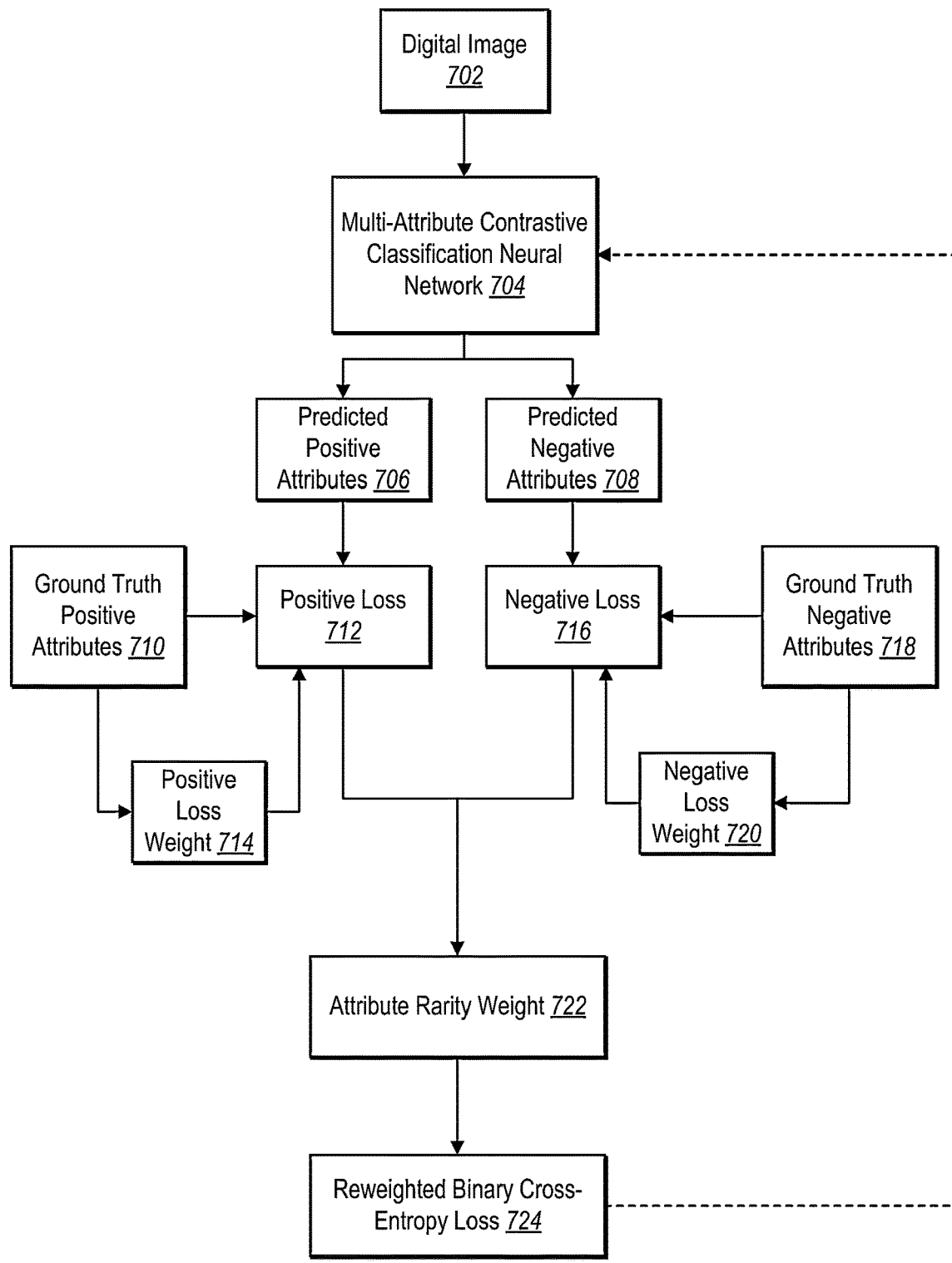
FIG. 7 illustrates the multi-attribute extraction system utilizing a reweighted binary cross-entropy loss with a multi-attribute contrastive classification neural network in accordance with one or more implementations.

As also mentioned above, in one or more embodiments, the multi-attribute extraction system 106 utilizes a reweighted binary cross-entropy loss to train the multi-attribute contrastive classification neural network. For instance, FIG. 7 illustrates the multi-attribute extraction system 106 determining and utilizing a reweighted binary cross-entropy loss to train the multi-attribute contrastive classification neural network. Indeed, as shown in FIG. 7, the multi-attribute extraction system 106 utilizes a positive loss weight, a negative loss weight, and an attribute rarity weight to determine a reweighted binary cross-entropy loss for positive and negative attribute predictions from a multi-attribute contrastive classification neural network.

To illustrate, as shown in FIG. 7, the multi-attribute extraction system 106 inputs a ground truth digital image 702 into a multi-attribute contrastive classification neural network 704. As further shown in FIG. 7, the multi-attribute contrastive classification neural network 704 outputs predicted positive attributes 706 in accordance with one or more embodiments herein. Then, as shown in FIG. 7, the multi-attribute extraction system 106 compares the predicted positive attributes 706 with ground truth positive attributes 710 (that correspond to the ground truth digital image 702) to generate a positive loss 712. In addition, as shown in FIG. 7, the multi-attribute extraction system 106 applies a positive loss weight 714, determined from the ground truth positive attributes 710, to the positive loss 712 to generate a weighted positive loss.

As also shown in FIG. 7, the multi-attribute contrastive classification neural network 704 outputs predicted negative attributes 708 in accordance with one or more embodiments herein. Subsequently, as illustrated in FIG. 7, the multi-attribute extraction system 106 compares the predicted negative attributes 708 with ground truth negative attributes 718 (that correspond to the ground truth digital image 702) to generate a negative loss 716. Moreover, as illustrated in FIG. 7, the multi-attribute extraction system 106 applies a negative loss weight 720, determined from the ground truth negative attributes 718, to the negative loss 716 to generate a weighted negative loss.

Indeed, as shown in FIG. 7, the multi-attribute extraction system 106 applies an attribute rarity weight 722 to the weighted positive loss generated from the positive loss 712 and the weighted negative loss generated from the negative loss 716 to generate a reweighted binary cross-entropy loss 724. Then, as shown in FIG. 7, the multi-attribute extraction system 106 utilizes the reweighted binary cross-entropy loss 724 to learn parameters for the multi-attribute contrastive classification neural network 704. In one or more embodiments, the multi-attribute extraction system 106 iteratively generates the reweighted binary cross-entropy loss 724 to learn parameters for the multi-attribute contrastive classification neural network 704.

In some embodiments, the multi-attribute extraction system 106 determines a number of positive attribute labels corresponding to an attribute c as $n_c^{pos}$. Moreover, in one or more embodiments, the multi-attribute extraction system 106 determines a number of negative attribute labels corresponding to the attribute c as $n_c^{neg}$. Then, in one or more embodiments, the multi-attribute extraction system 106 utilizes the number of positive attribute labels $n_c^{pos}$ and the number of negative attribute labels $n_c^{neg}$ to determine an attribute rarity weight factor, a positive loss weight factor, and a negative loss weight factor.

For example, the multi-attribute extraction system 106 determines an attribute rarity weight factor $w_c$ to provide importance (or weight) to rare attributes. In particular, in one or more embodiments, the multi-attribute extraction system 106 sets the attribute rarity weight factor $w_c$ as inversely proportional to its number of positive attribute labels $n_c^{pos}$ in accordance with the following function:

$$w_c \propto 1/(n_c^{pos})^\alpha \quad (17)$$

In some embodiments, the multi-attribute extraction system 106 normalizes the attribute rarity weight factor $w_c$ across the attributes C by ensuring that the sum of attribute rarity weights is equivalent to the number of attribute C in accordance with the following function:

$$\Sigma_c w_c = C \quad (18)$$

Furthermore, in some instances and in reference to the function (17), the multi-attribute extraction system 106 utilizes a smoothing factor $\alpha$.

In addition, in some embodiments, the multi-attribute extraction system 106 determines a positive loss weight factor $p_c$ by utilizing the number of positive attribute labels $n_c^{pos}$. For example, the multi-attribute extraction system 106 determines the positive loss weight factor $p_c$ in accordance with the following function:

$$p_c = 1/(n_c^{pos})^\alpha \quad (19)$$

Furthermore, in one or more embodiments, the multi-attribute extraction system 106 determines a negative loss weight factor $n_c$ by utilizing the number of negative attribute labels $n_c^{neg}$. For instance, the multi-attribute extraction system 106 determines the negative loss weight factor $n_c$ in accordance with the following function:

$$n_c = 1/(n_c^{neg})^\alpha \quad (20)$$

Additionally, in some embodiments, the multi-attribute extraction system 106 normalizes the positive loss weight factor $p_c$ and the negative loss weight factor $n_c$ such that the loss weight factors are equivalent to a normalization threshold (e.g., the sum of $p_c$ and $n_c$ are equivalent to a normalization threshold of 2). By normalizing as described above, the multi-attribute extraction system 106 balances the effect of the loss weight factors based on their frequency utilizing a ratio between the positive loss weight factor $p_c$ and the negative loss weight factor $n_c$ in accordance with the following function:

$$\frac{p_c}{n_c} = \left(\frac{n_c^{neg}}{n_c^{pos}}\right)^\alpha \quad (21)$$

As suggested above, in one or more embodiments, the multi-attribute extraction system 106 utilizes the positive loss weight factor $p_c$, negative loss weight factor $n_c$, and/or the attribute rarity weight factor $w_c$ to determine a reweighted binary cross-entropy loss. For example, the multi-attribute extraction system 106 represents predicted labels (e.g., outputs) of the multi-attribute contrastive classification neural network as $\hat{Y}_i = [\hat{y}_{i,1}, \ldots, \hat{y}_{i,C}]$ and the ground truth labels of the multi-attribute contrastive classification neural network as $Y_i$. Then, the multi-attribute extraction system 106 determines a reweighted binary cross-entropy loss $\mathcal{L}_{bce}(Y_i, \hat{Y}_i)$ in accordance with the following function:

$$\mathcal{L}_{bce}(Y_i, \hat{Y}_i) = -\Sigma_{c=1}^{C} w_c (\mathbb{1}_{[y_{i,c}=1]} \log(\hat{y}_{i,c}) + \mathbb{1}_{[y_{i,c}=0]} n_c \log(1 - \hat{y}_{i,c})) \quad (22)$$

As mentioned above in relation to function (22), $y_c \in \{1, 0, -1\}$ that denotes whether an attribute c is positive, negative, or missing respectively.

In one or more embodiments, the multi-attribute extraction system 106 utilizes reweighted binary cross-entropy loss (e.g., as described in function (22)) such that the loss dynamically adapts to the positive and negative label distribution of each attribute. For instance, by utilizing the reweighted binary cross-entropy loss function (22), the multi-attribute extraction system 106 prioritizes an attribute with too few positive examples while suppressing an attribute with too few negative examples during training.

In some cases, the multi-attribute extraction system 106 further utilizes repeat factor sampling along with the reweighted binary cross-entropy loss. For example, the multi-attribute extraction system 106 defines an image-level repeat factor for each digital image based on the rarity of attribute labels that correspond to each digital image. Then, the image-level repeat factor is applied to the reweighted binary cross-entropy loss.

As mentioned above, the multi-attribute extraction system 106 utilizes the reweighted binary cross-entropy loss jointly with various combinations of a relevant-object segmentation localizer loss $\mathcal{L}_{rel}$ (as described in relation to function (6)), a divergence loss $\mathcal{L}_{div}$ (as described in relation to function (12)), and/or a multi-attribute, supervised contrastive loss (as described in relation to function (15)). For example, the multi-attribute extraction system 106 trains the multi-attribute contrastive classification neural network by minimizing a joint loss $\mathcal{L}$ that includes the above-mentioned losses in accordance with the following function:

$$\mathcal{L} = \mathcal{L}_{bce} + \mathcal{L}_{rel} + \lambda_{div} \mathcal{L}_{div} + \lambda_{sup} \mathcal{L}_{sup} \quad (16)$$

In one or more embodiments, the multi-attribute extraction system 106 can utilize various combinations of the losses described herein. For example, in some cases, the multi-attribute extraction system 106 trains the multi-attribute contrastive classification neural network by minimizing a joint loss L that includes the above-mentioned losses in accordance with the following function:

$$\mathcal{L} = \mathcal{L}_{bce} + \mathcal{L}_{rel} + \lambda_{div} \mathcal{L}_{div} \quad (23)$$

Figure 8:
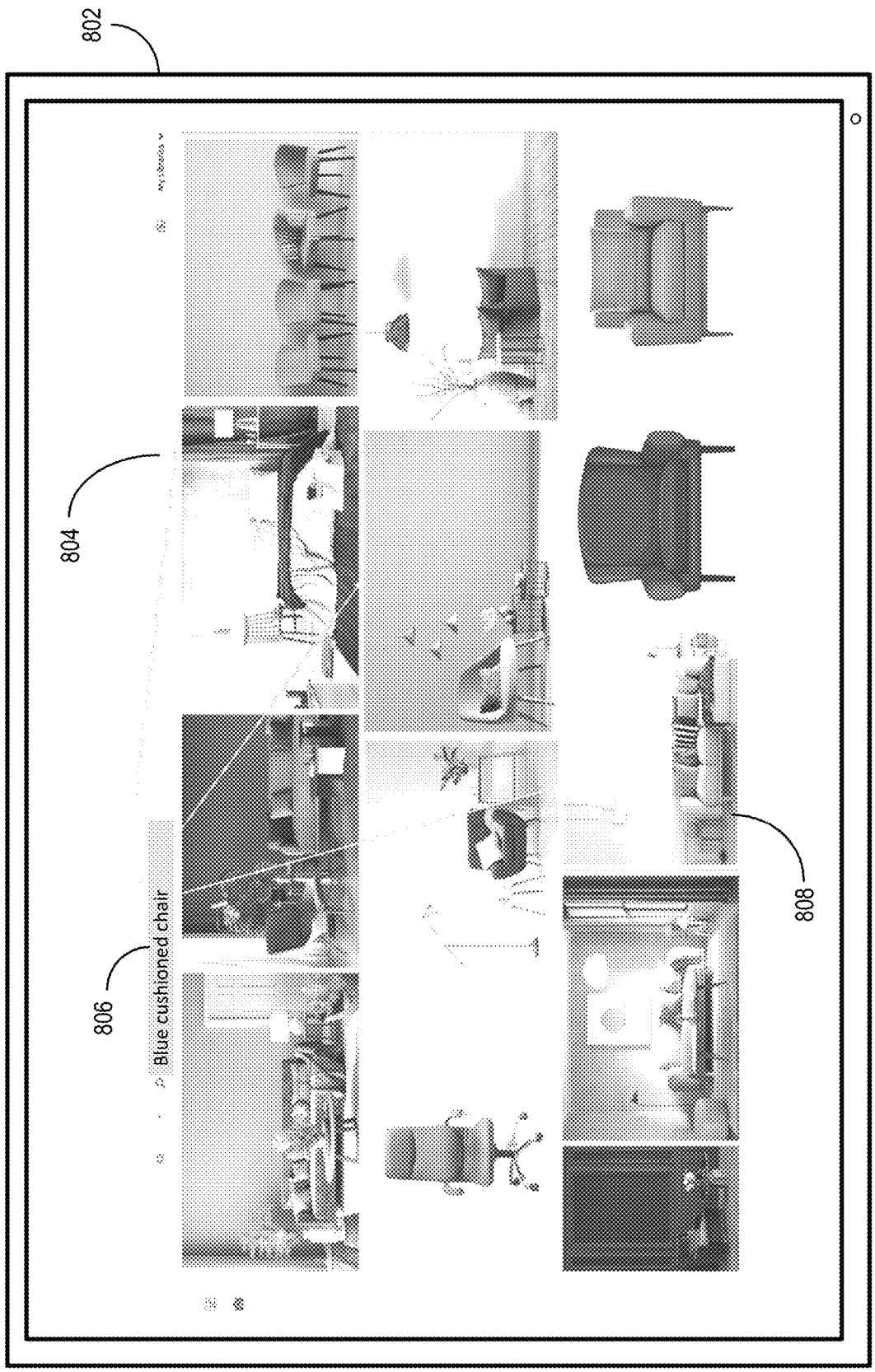
FIG. 8 illustrates the multi-attribute extraction system utilizing digital images with attributes extracted utilizing a multi-attribute contrastive classification neural network in accordance with one or more implementations.

As mentioned above, in some embodiments, the multi-attribute extraction system 106 utilizes digital images with extracted attributes in various applications. For example, FIG. 8 illustrates the multi-attribute extraction system 106 utilizing digital images with attributes extracted utilizing the multi-attribute contrastive classification neural network within an image search and retrieval application. As shown in FIG. 8, the multi-attribute extraction system 106 displays, within a graphical user interface 804 of a client device 802, an image search application. Upon receiving a search term 806 (e.g., "blue cushioned chair") within the graphical user interface 804, the multi-attribute extraction system 106 utilizes the wide variety of attributes determined for digital images from the multi-attribute contrastive classification neural network to provide accurate digital image search results 808 (e.g., a fine-grained image search). Indeed, as shown in FIG. 8, the multi-attribute extraction system 106 the digital image search results 808 correspond to digital images that include attributes related to the search term 806.

As mentioned above, the multi-attribute extraction system 106 accurately determines a wide variety of attribute labels for a wide variety of objects portrayed in digital images. For example, experimenters utilized a multi-attribute contrastive classification neural network in accordance with one or more embodiments to compare results with other attribute extraction models. In particular, the experimenters trained the various attribute extraction models utilizing a dataset of labeled images generated by the multi-attribute extraction system 106 in accordance with one or more embodiments herein. Furthermore, for fair evaluation, the experimenters provided the various attribute extraction models access to the same ground truth mask annotations during both training and testing. In addition, for fair evaluation, the experimenters also modified the various attribute extraction models to include the image-object composition module (as described above), utilized ResNet50 as their backbone, and utilized a classifier neural network having the same hidden units and output logit values for all classes.

Indeed, the experimenters extracted attributes for the dataset of labeled images generated by the multi-attribute extraction system 106 in accordance with one or more embodiments herein utilizing various attribute extraction models. For example, the various attribute extraction models included a ResNet-Baseline model that utilized an image-object composition module and classification layer and a ResNet-Baseline model that further utilized softmax cross entropy loss (ResNet-Baseline-CE). The attribute extraction models also included a strong baseline that combined the image-object feature composition, multi-attention, and relevant-object segmentation localizer with a regular binary cross-entropy loss in accordance with one or more embodiments herein (Strong Baseline SB), a ResNet-Baseline model that was trained using ranking loss instead of binary cross-entropy loss (e.g., LSEP), a graph convolution network based on the 100-d GloVE embeddings of attribute names (e.g., ML-GCN), a ResNet-Baseline model that was trained using partial binary cross-entropy loss with a graph neural network applied on the output logits (e.g., Partial BCE+GNN), and the attribute extraction model described in Sarafianos et. al., *Deep Imbalanced Attribute Classification Using Visual Attention Aggregation*, In Proceedings of the European Conference on Computer Vision (ECCV), pages 680-697, 2018.

Indeed, the strong baseline model utilized in the following results is a combination of the image-object feature composition, multi-attention, and relevant-object segmentation localizer in accordance with one or more embodiments herein. Moreover, in the following results, Supervised Contrastive Learning with Negative-Label Expansion (SCoNE) model includes the strong baseline model with reweighted binary cross-entropy loss, negative label expansion, and multi-attribute, supervised contrastive loss in accordance with one or more embodiments.

To measure and compare the attribute predictions between the various attribute extraction models and the SCoNE model as described in accordance with one or more embodiments herein, the experimenters employed various metrics. For example, the experimenters employed a mean average precisions metric (mAP) that reports mean average precision over all attribute classes, a mean accuracy metric (mA) that reports mean accuracy across all attribute classes using threshold at 0.5, an overall F1 score (F1@15) at top 15 predictions in each image, and a per-class recall score (mR@15) at top 15 predictions in each image. For example, the following Table 1 demonstrates the various metrics across the various attribute extraction models in comparison to the SCoNE model. As shown in Table 1, the SCoNE model performed with greater accuracy across each measured metric compared to the various attribute extraction models.

TABLE 1

| Methods | mAP | mR@15 | mA | F1@15 |
|---|---|---|---|---|
| LSEP | 61.0 | 50.7 | 67.1 | 62.3 |
| ML-GCN | 63.0 | 52.8 | 69.5 | 64.1 |
| Partial-BCE + GNN | 62.3 | 52.3 | 68.9 | 63.9 |
| ResNet-Baseline | 63.0 | 52.1 | 68.6 | 63.9 |
| ResNet-Baseline-CE | 56.4 | 55.8 | 50.3 | 61.5 |
| Sarafianos et al. | 64.6 | 51.1 | 68.3 | 64.6 |

TABLE 1-continued

| Methods | mAP | mR@15 | mA | F1@15 |
|---|---|---|---|---|
| Strong Baseline (SB) | 65.9 | 52.9 | 69.5 | 65.3 |
| SB + SCoNE | 68.3 | 58.3 | 71.5 | 70.3 |

Furthermore, the experimenters measured mAP metrics for attribute predictions across different attribute class imbalances (e.g., head, medium, tail attributes). For instance, the following Table 2 demonstrates the various metrics across the various attribute extraction models in comparison to the SCoNE model for the different attribute class imbalances. As shown in Table 2, the SCoNE model performed with greater accuracy across each attribute class imbalance compared to the various attribute extraction models.

TABLE 2

| | Class Imbalance (mAP) | | |
|---|---|---|---|
| Methods | Head | Medium | Tail |
| LSEP | 69.1 | 57.3 | 40.9 |
| ML-GCN | 70.8 | 59.8 | 42.7 |
| Partial-BCE + GNN | 70.1 | 58.7 | 40.1 |
| ResNet-Baseline | 71.1 | 59.4 | 43.0 |
| ResNet-Baseline-CE | 64.6 | 52.7 | 35.9 |
| Sarafianos et al. | 72.5 | 61.5 | 42.9 |
| Strong Baseline (SB) | 73.6 | 62.5 | 46.0 |
| SB + SCoNE | 76.5 | 64.8 | 48.0 |

Moreover, the experimenters measured mAP metrics for attribute predictions across various attribute types (e.g., color, material, shape, texture, and action). For example, the following Table 3 demonstrates the various metrics across the various attribute extraction models in comparison to the SCoNE model for the different attribute types. As shown in Table 3, the SCoNE model performed with greater accuracy across each attribute type compared to the various attribute extraction models.

TABLE 3

| Methods | Color | Material | Shape | Texture | Action | Others |
|---|---|---|---|---|---|---|
| LSEP | 56.1 | 67.1 | 63.1 | 58.7 | 50.7 | 64.9 |
| ML-GCN | 59.1 | 64.7 | 65.2 | 62.8 | 54.7 | 66.5 |
| Partial-BCE + GNN | 57.7 | 66.5 | 64.1 | 59.3 | 54.4 | 65.9 |
| ResNet-Baseline | 58.5 | 66.3 | 65.0 | 63.1 | 53.1 | 66.7 |
| ResNet-Baseline-CE | 54.0 | 64.6 | 55.9 | 54.6 | 47.5 | 59.2 |
| Sarafianos et al. | 62.9 | 68.8 | 64.9 | 62.3 | 56.6 | 67.4 |
| Strong Baseline (SB) | 64.5 | 68.9 | 67.1 | 66.1 | 57.2 | 68.7 |
| SB + SCoNE | 70.4 | 75.6 | 68.3 | 68.4 | 60.7 | 69.5 |

In addition, the experimenters conducted an ablation study to evaluate the improvements in overall performance using different components of SCoNE in accordance with one or more embodiments herein. For example, each component (e.g., utilizing a reweighted binary cross-entropy loss RR, a multi-attribute supervised contrastive loss SupCon, and negative attribute label expansion) was evaluated separately for attribute predictions and their performance metric scores. Indeed, the following Table 4 illustrates that each of component of SCoNE (additively) improve the performance of extracting attributes from digital images compared to a baseline model of SCoNE. As shown in Table 4, the SCoNE model (in accordance with one or more embodiments herein) demonstrates an improvement of approximately 4 mAP points over the baseline model of SCoNE. In addition, as shown in Table 4, the components of SCoNE (e.g., reweighted binary cross-entropy loss, multi-attribute supervised contrastive loss, and negative attribute label expansion) are model agnostic and improve the ResNet-Baseline model's mAP by approximately 5 points.

TABLE 4

| Methods | mAP | mR@15 | mA | F1@15 |
|---|---|---|---|---|
| Strong Baseline (SB) | 65.9 | 52.9 | 69.5 | 65.3 |
| SB + Negative | 67.7 | 54.3 | 70.0 | 69.6 |
| SB + Negative + SupCon | 68.2 | 55.2 | 70.3 | 70.0 |
| SCoNE (SB + RR + Neg + SupCon) | 68.3 | 58.3 | 71.5 | 70.3 |
| ResNet-Baseline | 63.0 | 52.1 | 68.6 | 63.9 |
| ResNet-Baseline + SCoNE | 66.4 | 56.8 | 70.7 | 68.8 |

Furthermore, the experimenters also conducted an ablation study to evaluate the improvements in overall performance using different neural network components of the utilized strong baseline model (e.g., a combination of the image-object feature composition, multi-attention, and relevant-object segmentation localizer in accordance with one or more embodiments herein). For instance, the strong baseline model was evaluated after removing various neural network components (multi-attention MA, low-level feature maps LL, an object localizer OL) for attribute predictions and their performance metric scores. Indeed, the following Table 5 illustrates that the removal of each component of the strong baseline model caused (in most cases) a decrease in performance of extracting attributes from digital images compared to the strong baseline model having each component (in accordance with one or more embodiments herein).

TABLE 5

| Methods | mAP | mR@15 | mA | F1@15 |
|---|---|---|---|---|
| Strong Baseline (SB) | 67.7 | 54.3 | 70.0 | 69.6 |
| SB w/o Multi-attention (MA) | 67.4 | 53.5 | 69.7 | 69.7 |
| SB w/o Low-level feature (LL) | 67.3 | 53.7 | 69.9 | 69.4 |
| SB w/o Object localizer (OL) | 66.9 | 53.1 | 69.6 | 69.1 |
| SB w/o OL, MA, and LL | 65.6 | 53.8 | 69.4 | 68.6 |

Figure 9:
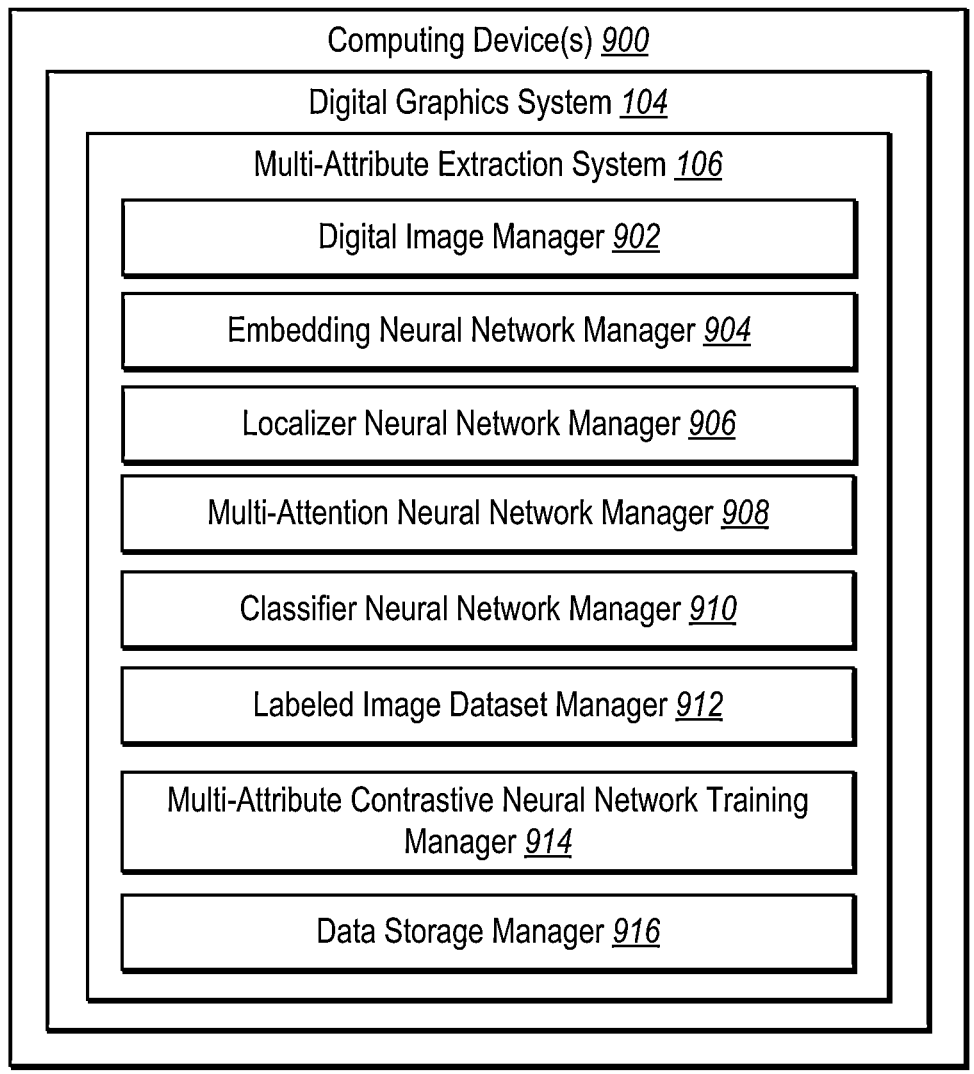
FIG. 9 illustrates a schematic diagram of the multi-attribute extraction system in accordance with one or more implementations.

Turning now to FIG. 9, additional detail will be provided regarding components and capabilities of one or more implementations of the multi-attribute extraction system. In particular, FIG. 9 illustrates an example multi-attribute extraction system 106 executed by a computing device 900 (e.g., server device(s) 102 or the client device 110). As shown by the implementation of FIG. 9, the computing device 900 includes or hosts the digital graphics system 104 and the multi-attribute extraction system 106. Furthermore, as shown in FIG. 9, the multi-attribute extraction system 106 includes a digital image manager 902, an embedding neural network manager 904, a localizer neural network manager 906, a multi-attention neural network manager 908, a classifier neural network manager 910, a labeled image dataset manager 912, a multi-attribute contrastive neural network training manager 914, and a data storage manager 916.

As just mentioned, and as illustrated inn the implementation of FIG. 9, the multi-attribute extraction system 106 includes the digital image manager 902. For example, the digital image manager 902 receives, retrieves, and/or stores one or more digital images that portray objects as described above. In addition, in some implementations, the digital image manager 902 also utilizes digital images with a multi-attribute contrastive neural network to determine attributes for objects portrayed in the digital images and utilize the attributes in applications such as, but not limited to, image search and/or tagging.

For instance, as shown in FIG. 9, the multi-attribute extraction system 106 includes the embedding neural network manager 904. In one or more embodiments, the embedding neural network manager 904 extracts feature attribute maps from digital images as described above (e.g., in relation to FIGS. 3 and 4). In some instances, the embedding neural network manager 904 extracts high-level and low-level feature attribute maps from digital images and also utilizes the high-level feature attribute maps to generate image-object feature maps as described above (e.g., in relation to FIGS. 3 and 4).

Furthermore, as shown in FIG. 9, the multi-attribute extraction system 106 includes the localizer neural network manager 906. For example, the localizer neural network manager 906 generates a localized object attention feature vector from an image-object feature map (that is utilized to generate a localized image-object feature vector and a localized low-level attribute feature vector) as described above (e.g., in relation to FIGS. 3 and 4). In some embodiments, the localizer neural network manager 906 also utilizes a localizer neural network that is trained utilizing supervised ground truth object segmentation masks as described above (e.g., in relation to FIGS. 3 and 4).

In addition, as shown in FIG. 9, the multi-attribute extraction system 106 includes the multi-attention neural network manager 908. In one or more embodiments, the multi-attention neural network manager 908 utilizes a multi-attention neural network to generate attention maps from an image-object feature map as described above (e.g., in relation to FIGS. 3 and 4). Indeed, in some embodiments, the multi-attention neural network manager 908 generates multi-attention feature vectors as described above (e.g., in relation to FIGS. 3 and 4).

Moreover, as shown in FIG. 9, the multi-attribute extraction system 106 includes the classifier neural network manager 910. For example, the classifier neural network manager 910 utilizes various combinations of a localized image-object feature vector, a localized low-level attribute feature vector, and multi-attention feature vectors to determine attributes for an object portrayed within a digital image as described above (e.g., in relation to FIGS. 3 and 4). Furthermore, in some embodiments, the classifier neural network manager 910 extracts both positive and negative attribute labels for an object portrayed in a digital image as described above (e.g., in relation to FIGS. 3 and 4).

Furthermore, as shown in FIG. 9, the multi-attribute extraction system 106 includes the labeled image dataset manager 912. In one or more embodiments, the labeled image dataset manager 912 generates a dataset of labeled images that include expanded attribute labels (e.g., negative attribute labels) as described above (e.g., in relation to FIG. 5). Additionally, as shown in FIG. 9, the multi-attribute extraction system 106 includes the multi-attribute contrastive neural network training manager 914. In one or more embodiments, the multi-attribute contrastive neural network training manager 914 utilizes a multi-attribute, supervised contrastive loss and/or a reweighted binary cross-entropy loss to learn parameters of a multi-attribute contrastive neural network as described above (e.g., in relation to FIGS. 6 and 7).

In addition, as shown in FIG. 9, the multi-attribute extraction system 106 includes the data storage manager 916. In some implementations, the data storage manager 916 is implemented by one or more memory devices. Moreover, in one or more implementations, the data storage manager 916 maintains data to perform one or more functions of the multi-attribute extraction system 106. For example, the data storage manager 916 includes image data (e.g., input digital images, dataset of labeled images), multi-attribute contrastive neural network components (e.g., an embedding neural network, a localizer neural network, a multi-attention neural network, a classifier neural network), extracted digital image components (e.g., attribute feature maps, image-object feature maps, object-label embedding vectors, localized object attribute attention feature vectors, localized low-level attribute feature vectors, multi-attention feature vectors), and attributes (e.g., positive attribute labels, negative attribute labels).

Each of the components 902-916 of the computing device 900 (e.g., the computing device 900 implementing the multi-attribute extraction system 106), as shown in FIG. 9, may be in communication with one another using any suitable technology. The components 902-916 of the computing device 900 can comprise software, hardware, or both. For example, the components 902-916 can comprise one or more instructions stored on a computer-readable storage medium and executable by processor of one or more computing devices. When executed by the one or more processors, the computer-executable instructions of the multi-attribute extraction system 106 (e.g., via the computing device 900) can cause a client device and/or server device to perform the methods described herein. Alternatively, the components 902-916 and their corresponding elements can comprise hardware, such as a special purpose processing device to perform a certain function or group of functions. Additionally, the components 902-916 can comprise a combination of computer-executable instructions and hardware.

Furthermore, the components 902-916 of the multi-attribute extraction system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-916 may be implemented as a stand-alone application, such as a desktop or mobile application. Furthermore, the components 902-916 may be implemented as one or more web-based applications hosted on a remote server. The components 902-916 may also be implemented in a suite of mobile device applications or "apps." To illustrate, the components 902-916 may be implemented in an application, including but not limited to, ADOBE PHOTO SHOP, ADOBE PREMIERE, ADOBE LIGHTROOM, ADOBE ILLUSTRATOR, ADOBE SUBSTANCE, or ADOBE STOCK. The foregoing are either registered trademarks or trademarks of Adobe Inc. in the United States and/or other countries.

Figure 10:
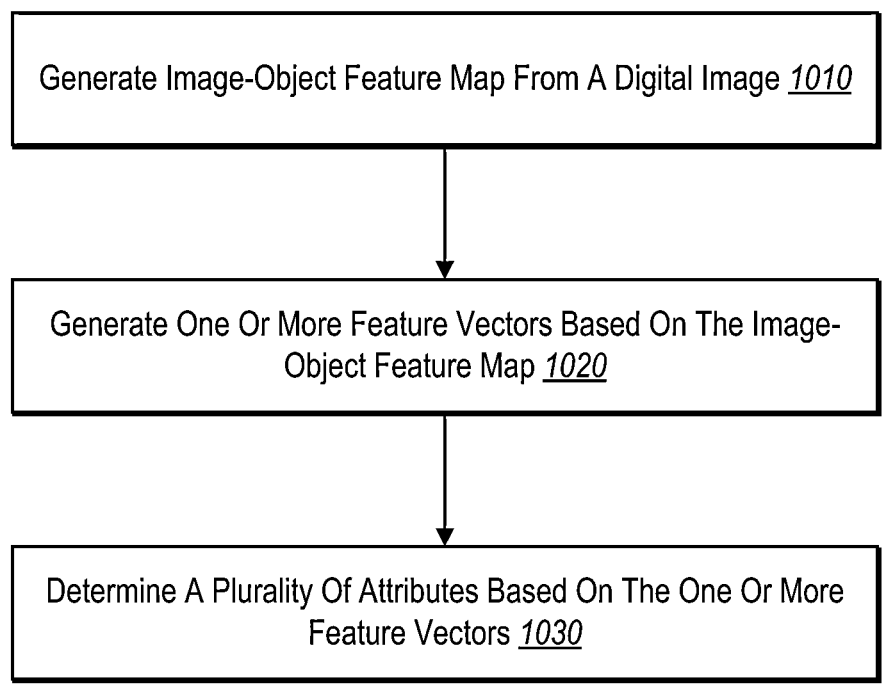
FIG. 10 illustrates a flowchart of a series of acts for determining attributes based on feature vectors in accordance with one or more implementations.
Figure 11:
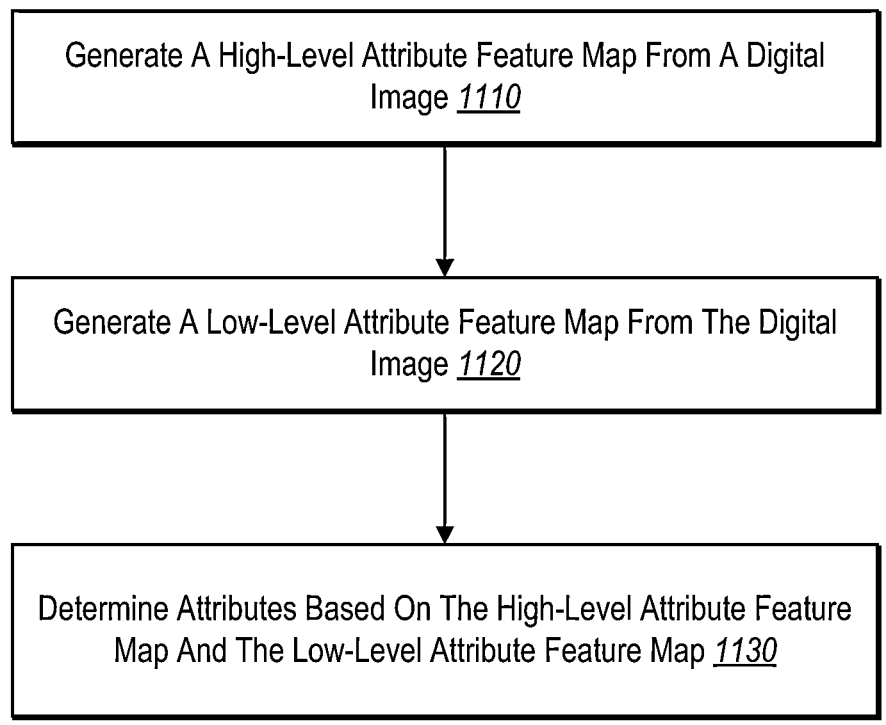
FIG. 11 illustrates a flowchart of a series of acts for determining positive and negative attributes based on attribute feature maps in accordance with one or more implementations.

FIGS. 1-9, the corresponding text, and the examples provide a number of different methods, systems, devices, and non-transitory computer-readable media of the multi-attribute extraction system 106. In addition to the foregoing, one or more implementations can also be described in terms of flowcharts comprising acts for accomplishing a particular result, as shown in FIGS. 10 and 11. The acts shown in FIGS. 10 and 11 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIGS. 10 and 11. In some implementations, a system can be configured to perform the acts of FIGS. 10 and 11. Alternatively, the acts of FIGS. 10 and 11 can be performed as part of a computer-implemented method.

As mentioned above, FIG. 10 illustrates a flowchart of a series of acts 1000 for determining attributes based on feature vectors in accordance with one or more implementations. While FIG. 10 illustrates acts according to one implementation, alternative implementations may omit, add to, reorder, and/or modify any of the acts shown in FIG. 10.

As shown in FIG. 10, the series of acts 1000 include an act 1010 of generating an image-object feature map from a digital image. For example, the act 1010 includes generating an image-object feature map reflecting attributes from a digital image portraying an object utilizing an embedding neural network. Furthermore, in some embodiments, the act 1010 includes generating an object-label embedding vector from a label corresponding to an object and generating an image-object feature map by combining a high-level attribute feature map and the object-label embedding vector. For example, the act 1010 includes generating a high-level attribute feature map for a portrayed object utilizing a high-level embedding layer of an embedding neural network and generating a low-level attribute feature map for the portrayed object utilizing a low-level embedding layer of the embedding neural network. In some embodiments, the act 1010 includes detecting an object from multiple objects within a digital image utilizing an object detector model.

As further shown in FIG. 10, the series of acts 1000 include an act 1020 of generating one or more feature vectors based on the image-object feature map. For example, the act 1020 includes generating a localized object attention feature vector reflecting a segmentation prediction of an object portrayed in a digital image from an image-object feature map utilizing a localizer neural network. Furthermore, in some embodiments, the act 1020 includes generating a localized image-object feature vector by combining a localized object attention feature vector with an image-object feature map. In addition, in one or more embodiments, the act 1020 includes generating a localized low-level attribute feature vector by combining a low-level attribute feature map with a localized object attention feature vector. Moreover, in some embodiments, the act 1020 includes generating a multi-attention feature vector from the image-object feature map using a plurality of attention layers of a multi-attention neural network.

As shown in FIG. 10, the series of acts 1000 also include an act 1030 of determining a plurality of attributes based on the one or more feature vectors. For example, the act 1030 includes determining a plurality of attributes from an object portrayed within a digital image utilizing a multi-attribute contrastive classification neural network that includes an embedding neural network, a localizer neural network, a multi-attention neural network, and a classifier neural network. For example, the act 1030 includes determining a plurality of attributes for an object portrayed within a digital image from a combination of a localized object attention feature vector and an image-object feature map utilizing a classifier neural network. In some embodiments, the act 1030 includes determining a plurality of attributes for an object portrayed within a digital image from a high-level attribute feature map and a low-level attribute feature map. Furthermore, in some embodiments, the act 1030 includes determining a plurality of attributes for an object portrayed within a digital image utilizing a classifier neural network from a localized image-object feature vector, a localized low-level attribute feature vector, and a multi-attention feature vector. In one or more embodiments, the act 1030 includes determining a plurality of attributes for an object portrayed within a digital image from a localized image-object feature vector and a multi-attention feature vector utilizing a classifier neural network. In some instances, the act 1030 includes determining a plurality of attributes for an object portrayed within a digital image utilizing a classifier neural network from a concatenation of a localized image-object feature vector, a multi-attention feature vector, and a localized low-level attribute feature vector. In one or more embodiments, the act 1030 includes determining a plurality of attributes for an object portrayed within the digital image by utilizing a plurality of probabilities outputs, from a classifier neural network, indicating the presence of attributes within the object portrayed within the digital image.

In some embodiments, the act 1030 includes determining a multi-attribute, supervised-contrastive loss by mapping an image-object feature map for an object to an attribute-aware embedding space comprising a plurality of dimensions corresponding to a plurality of attributes and mapping an additional image-object feature map for a similar object having overlapping attributes to the attribute-aware embedding space. Furthermore, in some embodiments, the act 1030 includes determining a multi-attribute, supervised-contrastive loss by comparing an object and a similar object along a plurality of dimensions corresponding to a plurality of attributes within an attribute-aware embedding space and learning parameters of a classifier neural network utilizing a multi-attribute, supervised-contrastive loss.

In one or more embodiments, the act 1030 includes determining a reweighted binary cross-entropy loss by utilizing a set of labeled images by applying a first weight to a positive loss corresponding to a positive attribute and a second weight different than the first weight to a negative loss corresponding to a negative attributes. Furthermore, in one or more embodiments, the act 1030 includes learning parameters for a multi-attribute contrastive classification neural network utilizing a reweighted binary cross-entropy loss. In some embodiments, the act 1030 includes determining a reweighted binary cross-entropy loss by applying a rarity weight corresponding to a rarity of a positive attribute to a positive loss. Moreover, in some embodiments, the act 1030 includes generating a negative attribute label within a set of labeled images by determining exclusive relationships or overlapping relationships between the negative attribute label and a positive attribute label corresponding to a labeled image within the set of labeled images.

Turning now to FIG. 11, FIG. 11 illustrates a flowchart of a series of acts 1100 for determining attributes based on attribute feature maps in accordance with one or more implementations. While FIG. 11 illustrates acts according to one implementation, alternative implementations may omit, add to, reorder, and/or modify any of the acts shown in FIG. 11.

As shown in FIG. 11, the series of acts 1100 include an act 1110 of generating a high-level attribute feature map from a digital image. For example, the act 1110 includes generating a high-level attribute feature map from a digital image portraying an object utilizing a high-level embedding layer of an embedding neural network. As further shown in FIG. 11, the series of acts 1100 include an act 1120 of generating a low-level attribute feature map from a digital image. For example, the act 1120 includes generating a low-level attribute feature map from a digital image utilizing a low-level embedding layer of an embedding neural network.

As shown in FIG. 11, the series of acts 1100 also include an act 1130 of determining attributes based on a high-level attribute feature map and a low-level attribute feature map. For example, the act 1130 includes determining a set of attributes for an object portrayed within a digital image from a combination of a high-level attribute feature map and a low-level attribute feature map utilizing a classifier neural network. In some embodiments, the act 1130 includes determining a set of attributes for an object portrayed within a digital image by utilizing a classifier neural network with a localized image-object feature vector based on a high-level attribute feature map and a localized low-level attribute feature vector based on a low-level attribute feature map.

Furthermore, in some embodiments, the act 1130 includes generating an image-object feature map by combining a high-level attribute feature map and an object-label embedding vector generated from a label corresponding to the object and generating a localized object attention feature vector from the image-object feature map reflecting a segmentation prediction of the object portrayed in the digital image utilizing a localizer neural network. In some instances, the act 1130 includes generating a localized image-object feature vector by combining a localized object attention feature vector with an image-object feature map. Furthermore, in some embodiments, the act 1130 includes generating a localized low-level attribute feature vector by combining a low-level attribute feature map with a localized object attention feature vector. In certain instances, the act 1130 includes generating a multi-attention feature vector from the image-object feature map using a plurality of attention layers of a multi-attention neural network and determining a set of attributes for an object portrayed within a digital image by utilizing a classifier neural network with the multi-attention feature vector.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
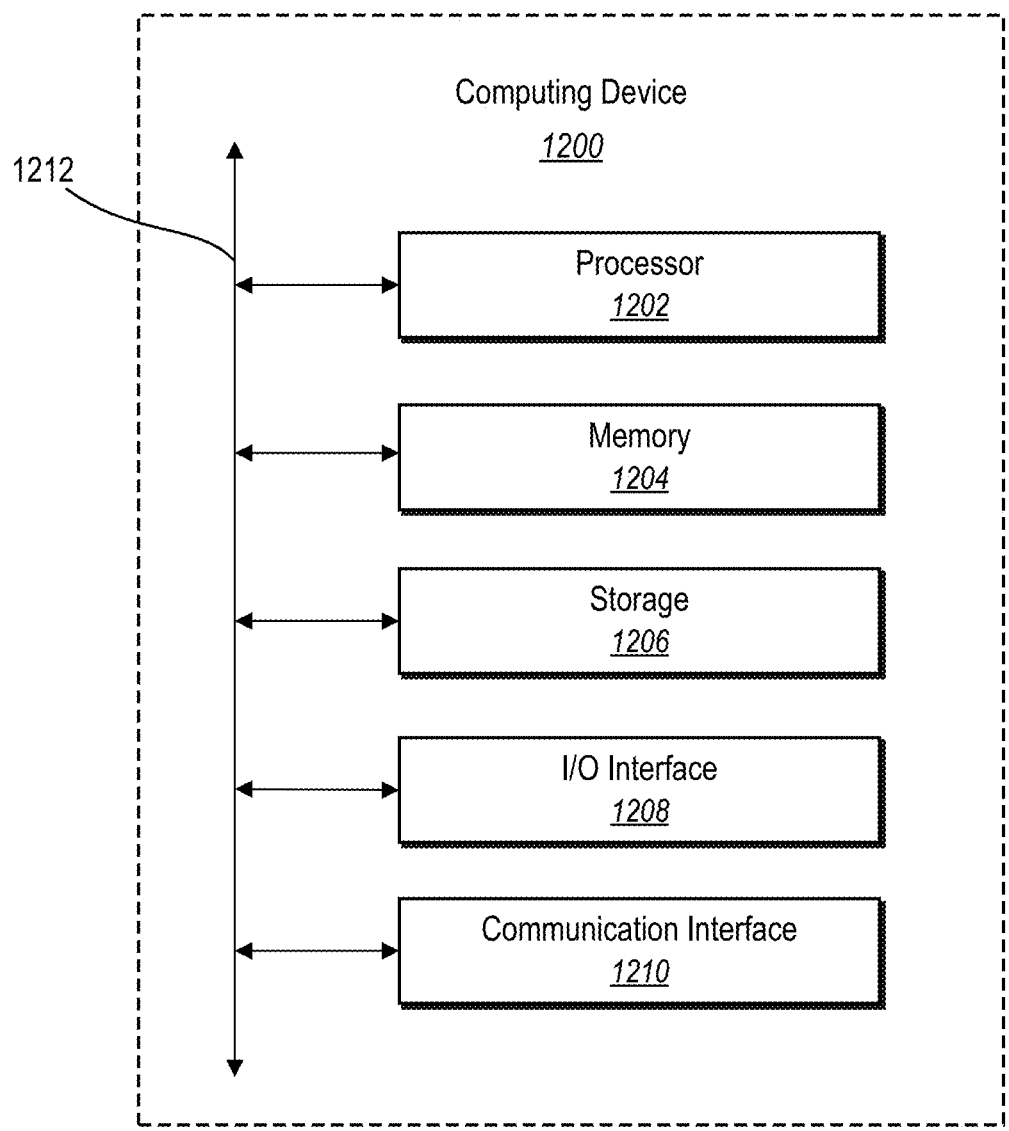
FIG. 12 illustrates a block diagram of an example computing device in accordance with one or more implementations.

FIG. 12 illustrates a block diagram of an example computing device 1200 that may be configured to perform one or more of the processes described above. One will appreciate that one or more computing devices, such as the computing device 1200 may represent the computing devices described above (e.g., computing device 900, server device(s) 102, and/or client device 110). In one or more implementations, the computing device 1200 may be a mobile device (e.g., a mobile telephone, a smartphone, a PDA, a tablet, a laptop, a camera, a tracker, a watch, a wearable device, etc.). In some implementations, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other implementations. Furthermore, in certain implementations, the computing device 1200 includes fewer components than those shown in FIG. 12. Components of the computing device 1200 shown in FIG. 12 will now be described in additional detail.

In particular implementations, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive ("HDD"), flash memory, a Universal Serial Bus ("USB") drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller ("NIC") or network adapter for communicating with an Ethernet or other wire-based network or a wireless NIC ("WNIC") or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
    generate an image-object feature map reflecting attributes from a digital image portraying an object utilizing an embedding neural network;
    generate a localized object attention feature vector reflecting a segmentation prediction of the object portrayed in the digital image from the image-object feature map utilizing a localizer neural network; and
    determine a plurality of attributes for the object portrayed within the digital image from a combination of the localized object attention feature vector and the image-object feature map utilizing a classifier neural network.

2. The non-transitory computer-readable medium of claim 1, further comprising instructions that, when executed by the at least one processor, cause the computing device to determine a multi-attribute, supervised-contrastive loss by:
    mapping the image-object feature map for the object to an attribute-aware embedding space comprising a plurality of dimensions corresponding to the plurality of attributes; and
    mapping an additional image-object feature map for a similar object having overlapping attributes to the attribute-aware embedding space.

3. The non-transitory computer-readable medium of claim 2, further comprising instructions that, when executed by the at least one processor, cause the computing device to:
    determine the multi-attribute, supervised-contrastive loss by comparing the object and the similar object along the plurality of dimensions corresponding to the plurality of attributes within the attribute-aware embedding space; and
    learn parameters of the classifier neural network utilizing the multi-attribute, supervised-contrastive loss.

4. The non-transitory computer-readable medium of claim 1, further comprising instructions that, when executed by the at least one processor, cause the computing device to:
    generate a high-level attribute feature map for the portrayed object utilizing a high-level embedding layer of the embedding neural network;
    generate a low-level attribute feature map for the portrayed object utilizing a low-level embedding layer of the embedding neural network; and
    determine the plurality of attributes for the object portrayed within the digital image from the high-level attribute feature map and the low-level attribute feature map.

5. The non-transitory computer-readable medium of claim 4, further comprising instructions that, when executed by the at least one processor, cause the computing device to:
    generate an object-label embedding vector from a label corresponding to the object; and
    generate the image-object feature map by combining the high-level attribute feature map and the object-label embedding vector.

6. The non-transitory computer-readable medium of claim 4, further comprising instructions that, when executed by the at least one processor, cause the computing device to determine the plurality of attributes for the object portrayed within the digital image utilizing the classifier neural network from a localized image-object feature vector, a localized low-level attribute feature vector, and a multi-attention feature vector.

7. The non-transitory computer-readable medium of claim 6, further comprising instructions that, when executed by the at least one processor, cause the computing device to generate the localized image-object feature vector by combining the localized object attention feature vector with the image-object feature map.

8. The non-transitory computer-readable medium of claim 6, further comprising instructions that, when executed by the at least one processor, cause the computing device to generate the localized low-level attribute feature vector by combining the low-level attribute feature map with the localized object attention feature vector.

9. The non-transitory computer-readable medium of claim 6, further comprising instructions that, when executed by the at least one processor, cause the computing device to generate the multi-attention feature vector from the image-object feature map using a plurality of attention layers of a multi-attention neural network.

10. The non-transitory computer-readable medium of claim 1, further comprising instructions that, when executed by the at least one processor, cause the computing device to determine the plurality of attributes for the object portrayed within the digital image by utilizing a plurality of probability outputs, from the classifier neural network, indicating a presence of attributes within the object portrayed within the digital image.

11. A method comprising:
generating an image-object feature map reflecting attributes from a digital image portraying an object utilizing an embedding neural network;
generating a localized object attention feature vector reflecting a segmentation prediction of the object portrayed in the digital image from the image-object feature map utilizing a localizer neural network; and
determining a plurality of attributes for the object portrayed within the digital image from a combination of the localized object attention feature vector and the image-object feature map utilizing a classifier neural network.

12. The method of claim 11, further comprising:
generating a high-level attribute feature map for the portrayed object utilizing a high- level embedding layer of the embedding neural network;
generating a low-level attribute feature map for the portrayed object utilizing a low-level embedding layer of the embedding neural network; and
determining the plurality of attributes for the object portrayed within the digital image from the high-level attribute feature map and the low-level attribute feature map.

13. The method of claim 12, further comprising:
generating an object-label embedding vector from a label corresponding to the object; and
generating the image-object feature map by combining the high-level attribute feature map and the object-label embedding vector.

14. The method of claim 12, further comprising determining the plurality of attributes for the object portrayed within the digital image utilizing the classifier neural network from a localized image-object feature vector, a localized low-level attribute feature vector, and a multi-attention feature vector.

15. The method of claim 11, further comprising determining the plurality of attributes for the object portrayed within the digital image by utilizing a plurality of probability outputs, from the classifier neural network, indicating a presence of attributes within the object portrayed within the digital image.

16. A system comprising:
one or more memory devices; and
one or more processors coupled to the one or more memory devices that cause the system to perform operations comprising:
generating an image-object feature map reflecting attributes from a digital image portraying an object utilizing an embedding neural network;
generating a localized object attention feature vector reflecting a segmentation prediction of the object portrayed in the digital image from the image-object feature map utilizing a localizer neural network; and
determining a plurality of attributes for the object portrayed within the digital image from a combination of the localized object attention feature vector and the image- object feature map utilizing a classifier neural network.

17. The system of claim 16, wherein the operations further comprise:
generating a high-level attribute feature map for the portrayed object utilizing a high- level embedding layer of the embedding neural network;
generating a low-level attribute feature map for the portrayed object utilizing a low-level embedding layer of the embedding neural network; and
determining the plurality of attributes for the object portrayed within the digital image from the high-level attribute feature map and the low-level attribute feature map.

18. The system of claim 17, wherein the operations further comprise:
generating an object-label embedding vector from a label corresponding to the object; and
generating the image-object feature map by combining the high-level attribute feature map and the object-label embedding vector.

19. The system of claim 17, wherein the operations further comprise:
determining the plurality of attributes for the object portrayed within the digital image utilizing the classifier neural network from a localized image-object feature vector, a localized low-level attribute feature vector, and a multi-attention feature vector.

20. The system of claim 16, wherein the operations further comprise:
determining the plurality of attributes for the object portrayed within the digital image by utilizing a plurality of probability outputs, from the classifier neural network, indicating a presence of attributes within the object portrayed within the digital image.

* * * * *